US 12,503,948 B2
(12) United States Patent
Koga et al.

(10) Patent No.: US 12,503,948 B2
(45) Date of Patent: Dec. 23, 2025

(54) FIRST-STAGE STATIONARY BLADE SEGMENT, STATIONARY UNIT, FIRST-STAGE STATIONARY BLADE SEGMENT UNIT, AND STEAM TURBINE

(71) Applicant: MITSUBISHI HEAVY INDUSTRIES, LTD., Tokyo (JP)

(72) Inventors: Yasuhiko Koga, Tokyo (JP); Shouhei Danno, Tokyo (JP); Yuki Sekiguchi, Tokyo (JP); Yoichi Miyazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 20 days.

(21) Appl. No.: 18/288,432

(22) PCT Filed: Jun. 15, 2022

(86) PCT No.: PCT/JP2022/024011
§ 371 (c)(1),
(2) Date: Oct. 26, 2023

(87) PCT Pub. No.: WO2022/270387
PCT Pub. Date: Dec. 29, 2022

(65) Prior Publication Data
US 2024/0141796 A1 May 2, 2024

(30) Foreign Application Priority Data
Jun. 24, 2021 (JP) ................................ 2021-104776

(51) Int. Cl.
*F01D 9/04* (2006.01)
(52) U.S. Cl.
CPC .......... *F01D 9/041* (2013.01); *F05D 2220/31* (2013.01); *F05D 2240/12* (2013.01)

(58) Field of Classification Search
CPC ........................................................ F01D 3/02
See application file for complete search history.

(56) References Cited

U.S. PATENT DOCUMENTS 3,817,654 A * 6/1974 Sohma ...................... F01D 5/06
415/103
4,392,778 A * 7/1983 Hess ...................... F01D 25/246
415/189
(Continued)

FOREIGN PATENT DOCUMENTS

DE 10 2011 055 469 9/2012
DE 10 2019 202 356 9/2019
(Continued)

OTHER PUBLICATIONS

International Search Report issued Aug. 23, 2022 in International Application No. PCT/JP2022/024011, with English translation.
(Continued)

*Primary Examiner* — Kayla Mccaffrey
(74) *Attorney, Agent, or Firm* — Wenderoth, Lind & Ponack, L.L.P.

(57) ABSTRACT

A first-stage stationary blade segment includes an outer ring extending in a circumferential direction, and a plurality of first-stage stationary blades attached on a radially inner side of the outer ring so as to be aligned in the circumferential direction. Each of the first-stage stationary blades has a blade body extending in the radial direction, and an outer shroud formed on a radially outer side of the blade body with respect to an axis. The outer shroud has a shroud main body, and an embedded portion connected to the radially outer side of the shroud main body. The embedded part has an embedded front end surface facing the side upstream along the axis, and an embedded rear end surface facing the side downstream along the axis. The outer ring has outer ring
(Continued)

grooves into which the outer shrouds of each of the plurality of first-stage stationary blades is inserted.

12 Claims, 7 Drawing Sheets

(56) References Cited

U.S. PATENT DOCUMENTS

| | | | | |
|---|---|---|---|---|
| 5,024,579 | A * | 6/1991 | Groenendaal, Jr. | F01D 25/246 415/138 |
| 7,179,052 | B2 * | 2/2007 | Sasaki | F01D 9/042 29/889.22 |
| 7,874,795 | B2 * | 1/2011 | Burdgick | F01D 9/044 415/209.3 |
| 8,657,562 | B2 * | 2/2014 | Burdgick | F01D 9/02 415/190 |
| 8,684,697 | B2 * | 4/2014 | Werther | F01D 9/042 416/220 R |
| 9,551,224 | B2 * | 1/2017 | Onishi | F01D 9/042 |
| 10,760,449 | B2 | 9/2020 | Shirota et al. | |
| 2012/0128465 | A1 | 5/2012 | Burdgick et al. | |
| 2019/0277158 | A1 | 9/2019 | Iwasaki et al. | |
| 2020/0095878 | A1 * | 3/2020 | Waki | F01D 5/32 |

FOREIGN PATENT DOCUMENTS

| | | |
|---|---|---|
| DE | 11 2018 000 898 | 10/2019 |
| EP | 1 408 198 | 4/2004 |
| JP | 60-082502 | 6/1985 |

OTHER PUBLICATIONS

Written Opinion of the International Searching Authority issued Aug. 23, 2022 in International Application No. PCT/JP2022/024011, with English translation.

* cited by examiner

FIRST-STAGE STATIONARY BLADE SEGMENT, STATIONARY UNIT, FIRST-STAGE STATIONARY BLADE SEGMENT UNIT, AND STEAM TURBINE

TECHNICAL FIELD

The present invention relates to a first-stage stationary blade segment that includes a plurality of first-stage stationary blades, a first-stage stationary blade segment unit that includes the first-stage stationary blade segment, a stationary unit that includes the first-stage stationary blade segment, and a steam turbine that includes the first-stage stationary blade segment.

This application claims the right of priority based on Japanese Patent Application No. 2021-104776 filed with the Japan Patent Office on Jun. 24, 2021, the content of which is incorporated herein by reference.

BACKGROUND ART

As a type of steam turbine, for example, there is a dichotomous steam turbine described in PTL 1 below. The dichotomous steam turbine includes a first steam turbine section and a second steam turbine section. Each of the first steam turbine section and the second steam turbine section includes a rotor rotating with an axis as a center, a casing that covers the rotor, a plurality of stationary blade segments fixed to the casing, a steam inlet duct, and a diverting member. For the convenience of the following description, a direction in which the axis extends will be referred to as an axis direction. Further, one side of both sides in the axis direction will be referred to as a first side, and the other side will be referred to as a second side.

The first steam turbine section and the second steam turbine section share the steam inlet duct and the diverting member. In the first steam turbine section, parts other than the steam inlet duct and the diverting member are disposed on the first side in the axis direction with the steam inlet duct as a reference. In the first steam turbine section, the second side forms an axis upstream side, and the first side forms an axis downstream side. Further, in the second steam turbine section, parts other than the steam inlet duct are disposed on the second side with the steam inlet duct as a reference. In the second steam turbine section, the first side forms the axis upstream side and the second side forms the axis downstream side.

Each of the rotors of the first steam turbine section and the second steam turbine section has a rotor shaft extending in the axis direction with the axis as a center, and a plurality of rotor blade rows fixed to an outer periphery of the rotor shaft and arranged in the axis direction. Each rotor blade row includes a plurality of rotor blades arranged in a circumferential direction with respect to the axis. One stationary blade row among a plurality of stationary blade rows is disposed at a position on the axis upstream side of each rotor blade row. Each stationary blade row includes a plurality of stationary blades arranged in the circumferential direction. A stationary blade segment includes an outer ring extending in the circumferential direction, and a plurality of stationary blades disposed on a radially inner side of the outer ring. The outer ring is recessed from a radially inner side with respect to the axis toward a radially outer side and is formed with an outer ring groove extending in the circumferential direction. Outer shrouds of the plurality of stationary blades are fitted into the outer ring groove of the outer ring. The outer ring is fixed to a portion on the radially inner side of the casing (or a blade ring). The rotor of the first steam turbine section and the rotor of the second steam turbine section are located on the same axis and are connected to each other.

The stationary blade has a blade body extending in a radial direction and having an airfoil shape in a cross-sectional shape perpendicular to the radial direction with respect to the axis, an inner shroud formed on the radially inner side of the blade body, and an outer shroud formed on the radially outer side of the blade body.

The diverting member connects the inner shrouds of a plurality of first-stage stationary blades of the first steam turbine section and the inner shrouds of the first-stage stationary blades of the second steam turbine section. Due to this diverting member, it is possible to lead part of the steam that has flowed in from the steam inlet duct to the first-stage stationary blade of the first steam turbine section and to lead the remaining part of the steam that has flowed in from the steam inlet duct to the first-stage stationary blade of the second steam turbine section.

The outer shroud of the first-stage stationary blade has a shroud main body, an embedded portion, and a downstream-side extension portion. The shroud main body has an outer gas path surface which faces the radially inner side, and to which the blade body is connected. The embedded portion protrudes from the shroud main body toward the radially outer side. The embedded portion of the outer shroud is fitted into the outer ring groove of the first-stage outer ring. The downstream-side extension portion protrudes from the shroud main body toward the axis downstream side. The downstream-side extension portion faces the first-stage rotor blade in the radial direction.

CITATION LIST

Patent Literature

[PTL 1] Japanese Unexamined Utility Model Registration Application Publication No. S60-082502

SUMMARY OF INVENTION

Technical Problem

In the steam turbine, from the viewpoint of turbine efficiency or the like, the stationary blade segment, the casing, and the rotor are mutually subject to design constraints. However, it is desirable for these parts to have a high degree of freedom in design while satisfying requirements such as turbine efficiency.

Therefore, the present disclosure has an object to provide a technique capable of increasing the degree of freedom in designing a casing while satisfying requirements such as turbine efficiency.

Solution to Problem

A first-stage stationary blade segment as an aspect of the present disclosure for achieving the above object includes an outer ring that extends in a circumferential direction with respect to an axis, and a plurality of first-stage stationary blades mounted side by side in the circumferential direction on a radially inner side with respect to the axis of the outer ring. Out of a first side and a second side in an axis direction in which the axis extends, the second side forms an axis upstream side, and the first side forms an axis downstream side. Each of the plurality of first-stage stationary blades includes a blade body extending in a radial direction with respect to the axis, an inner shroud formed on the radially inner side of the blade body, and an outer shroud formed on a radially outer side with respect to the axis of the blade body. The blade body has a leading edge that forms an edge on the axis upstream side, and a trailing edge that forms an edge on the axis downstream side. The inner shroud has an inner gas path surface which faces the radially outer side, and to which the blade body is connected. The outer shroud has a shroud main body having an outer gas path surface which faces the radially inner side and to which the blade body is connected, and an embedded portion connected to the radially outer side of the shroud main body. The embedded portion has an embedded front end surface that faces the axis upstream side, an embedded rear end surface that faces the axis downstream side and that is in a back-to-back relationship with the embedded front end surface, and an embedded bottom surface that faces the radially outer side and that connects the embedded front end surface and the embedded rear end surface. The outer ring has an outer ring groove into which the outer shroud of each of the plurality of first-stage stationary blades enters, an outer ring gas path surface, an outer ring rear end surface, and an outer ring outer peripheral surface. The outer ring groove is recessed from an end on the axis downstream side of the outer ring gas path surface toward the radially outer side, and extends in the circumferential direction. The outer ring groove has a groove front side surface that faces the axis downstream side and that faces the embedded front end surface, a groove rear side surface that faces the axis upstream side and that faces the embedded rear end surface, and a groove bottom surface that faces the radially inner side and that faces the embedded bottom surface. The outer ring gas path surface has a curved surface so as to gradually extend toward the axis downstream side toward the radially inner side from a position on the axis upstream side with respect to the groove front side surface and on the radially outer side with respect to the outer gas path surface, and to be continuous with the outer gas path surface. The outer ring rear end surface is located on the axis downstream side with respect to the outer ring groove and faces the axis downstream side. The outer ring outer peripheral surface faces the radially outer side and connects an edge on the radially outer side of the outer ring gas path surface and an edge on the radially outer side of the outer ring rear end surface. The embedded front end surface is located on the axis upstream side with respect to the leading edge. The embedded rear end surface is located on the axis upstream side with respect to the trailing edge.

In the first-stage stationary blade segment of this aspect, the embedded front end surface of the embedded portion in the first-stage stationary blade is located on the axis upstream side with respect to the leading edge of the blade body in the first-stage stationary blade, and the embedded rear end surface of the embedded portion is located on the axis upstream side with respect to the trailing edge of the blade body. Therefore, in the first-stage stationary blade of the first-stage stationary blade segment of this aspect, the embedded portion is shifted to the axis upstream side with respect to the blade body. Therefore, the groove rear side surface of the outer ring groove into which the embedded portion of the first-stage stationary blade enters can be prevented from being located on the axis upstream side with respect to the trailing edge of the blade body, and the outer ring rear end surface can be prevented from being located on the axis downstream side with respect to the first-stage stationary blade. In other words, in this aspect, it is possible to reduce protruding portions of the outer ring to the axis downstream side with respect to the first-stage stationary blade, or it is possible to eliminate protruding portions of the outer ring to the axis downstream side with respect to the first-stage stationary blade.

Therefore, in this aspect, the degree of freedom in designing a casing on which the outer ring is mounted can be increased. In this manner, the degree of freedom in designing the casing is increased, so that it is possible to make a part of the casing present even within a common region of the region in the axis direction where a first-stage rotor blade is present and the region in the radial direction where an outer ring is present. If a part of the casing can be present within the common region, it is possible to mount a first-stage seal ring, which seals a gap between the casing and the first-stage rotor blade, on a part of the casing without widening an interval in the axis direction between the first-stage stationary blade and the first-stage rotor blade.

If the interval in the axis direction between the first-stage stationary blade and the first-stage rotor blade is widened, there is a high probability of reducing turbine efficiency. However, in this aspect, as described above, the first-stage seal ring can be mounted on a part of the casing without widening the interval in the axis direction between the first-stage stationary blade and the first-stage rotor blade. Therefore, in this aspect, it is possible to increase the degree of freedom in designing the casing while satisfying requirements such as turbine efficiency.

A stationary unit as an aspect of the present disclosure for achieving the above object includes the first-stage stationary blade segment as one aspect described above, and a blade ring on which the first-stage stationary blade segment and a first-stage seal ring are mounted. The blade ring has a blade ring gas path surface that faces the radially inner side, an outer ring mounting portion on which the outer ring is mounted, and a first-stage seal ring mounting portion on which the first-stage seal ring is mounted. The first-stage seal ring mounting portion is recessed from the blade ring gas path surface toward the radially outer side and extends in the circumferential direction. The entire outer ring mounting portion is located on the axis upstream side with respect to the first-stage seal ring mounting portion.

A steam turbine as an aspect of the present disclosure for achieving the above object includes the stationary unit as one aspect described above, a steam inlet duct, a rotor rotatable with the axis as a center, and a casing that covers an outer periphery of the rotor. The casing has the blade ring. The steam inlet duct is disposed such that steam flows in between an outer periphery side of the rotor and an inner periphery side of the casing from the axis upstream side.

A first-stage stationary blade segment unit as an aspect of the present disclosure for achieving the above object includes a first first-stage stationary blade segment that is the first-stage stationary blade segment as one aspect described above, a second first-stage stationary blade segment disposed to be spaced apart from the first first-stage stationary blade segment toward the second side, and a diverting member that extends in the circumferential direction and that connects the first first-stage stationary blade segment and the second first-stage stationary blade segment. The second first-stage stationary blade segment includes a second outer ring which extends in the circumferential direction and has the same shape as a first outer ring that is the outer ring of the first first-stage stationary blade segment, and in which the first side is an axis upstream side and the second side is an axis downstream side, and a plurality of second first-stage stationary blades which are mounted side by side in the circumferential direction on the radially inner side of the second outer ring and have the same shape as a plurality of first first-stage stationary blades that are the plurality of first-stage stationary blades of the first first-stage stationary blade segment, and in which the first side is an axis upstream side and the second side is an axis downstream side. The diverting member has a first connecting portion that is connected to the inner shroud of each of the plurality of first first-stage stationary blades, a second connecting portion that is connected to the inner shroud of each of the plurality of second first-stage stationary blades, and a main body that connects the first connecting portion and the second connecting portion. The main body has a gas path surface that faces the radially outer side, extends in the axis direction, and is continuous with the inner gas path surface of each of the plurality of first first-stage stationary blades and with the inner gas path surface of each of the plurality of second first-stage stationary blades.

A steam turbine as another aspect of the present disclosure for achieving the above object includes the first-stage stationary blade segment unit as one aspect described above, a steam inlet duct, a first rotor rotatable with the axis as a center, a plurality of first rear-stage stationary blade rows arranged in the axis direction on an outer periphery side of the first rotor, a first casing which covers the outer periphery side of the first rotor and on which the first first-stage stationary blade segment and the plurality of first rear-stage stationary blade rows are mounted, a second rotor rotatable with the axis as a center, a plurality of second rear-stage stationary blade rows arranged in the axis direction on an outer periphery side of the second rotor, and a second casing which covers the outer periphery side of the second rotor and on which the second first-stage stationary blade segment and the plurality of second rear-stage stationary blade rows are mounted. The first rotor and the second rotor are located on the same axis and are connected to each other. The steam inlet duct is disposed at a position separated from the gas path surface of the diverting member toward the radially outer side, and connects the first casing and the second casing.

Advantageous Effects of Invention

According to an aspect of the present disclosure, it is possible to increase the degree of freedom in designing a casing while satisfying requirements such as turbine efficiency.

DESCRIPTION OF EMBODIMENTS

Hereinafter, an embodiment of a steam turbine according to the present disclosure will be described in detail with reference to FIGS. 1 to 7.

Figure 1:
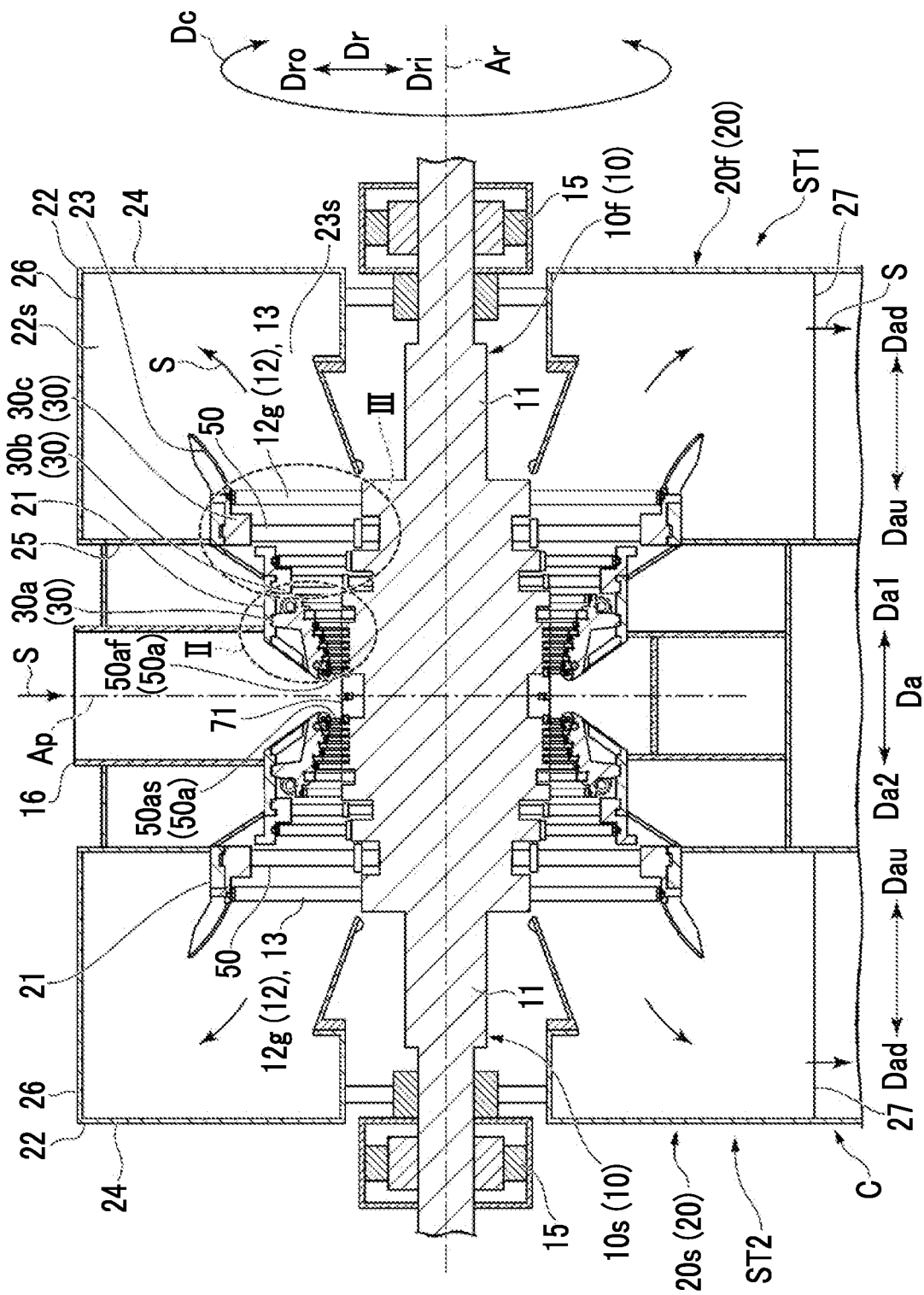
FIG. 1 is a sectional view of a steam turbine in an embodiment according to the present disclosure.

The steam turbine in the present embodiment is a dichotomous steam turbine, as shown in FIG. 1. The steam turbine includes a first steam turbine section ST1 and a second steam turbine section ST2. Each of the first steam turbine section ST1 and the second steam turbine section ST2 includes a rotor 10 that rotates with an axis Ar as a center, a casing 20 that covers the rotor 10, a plurality of stationary blade rows 50 mounted on the casing 20, a bearing 15, a steam inlet duct 16, and a diverting member 71. The rotor 10 of the first steam turbine section ST1 and the rotor 10 of the second steam turbine section ST2 are located on the same axis Ar and are connected to each other to be integrally rotatable. For the convenience of the following description, a direction in which the axis Ar extends will be referred to as an axis direction Da. Further, one side of both sides in the axis direction Da will be referred to as a first side Da1, and the other side will be referred to as a second side Da2.

The first steam turbine section ST1 and the second steam turbine section ST2 share the steam inlet duct 16 and the diverting member 71. In the first steam turbine section ST1, parts other than the steam inlet duct 16 and the diverting member 71 are disposed on the first side Da1 in the axis direction Da with the steam inlet duct 16 as a reference. In the first steam turbine section ST1, the second side Da2 forms an axis upstream side Dau and the first side Da1 forms an axis downstream side Dad. Further, in the second steam turbine section ST2, parts other than the steam inlet duct 16 and the diverting member 71 are disposed on the second side Da2 with the steam inlet duct 16 as a reference. In the second steam turbine section ST2, the first side Da1 forms the axis upstream side Dau and the second side Da2 forms the axis downstream side Dad. The first steam turbine section ST1 and the second steam turbine section ST2 have the same shape and structure. However, the axis upstream side Dau in the second steam turbine section ST2 is the opposite side to the axis upstream side Dau in the first steam turbine section ST1 in the axis direction Da.

Figure 2:
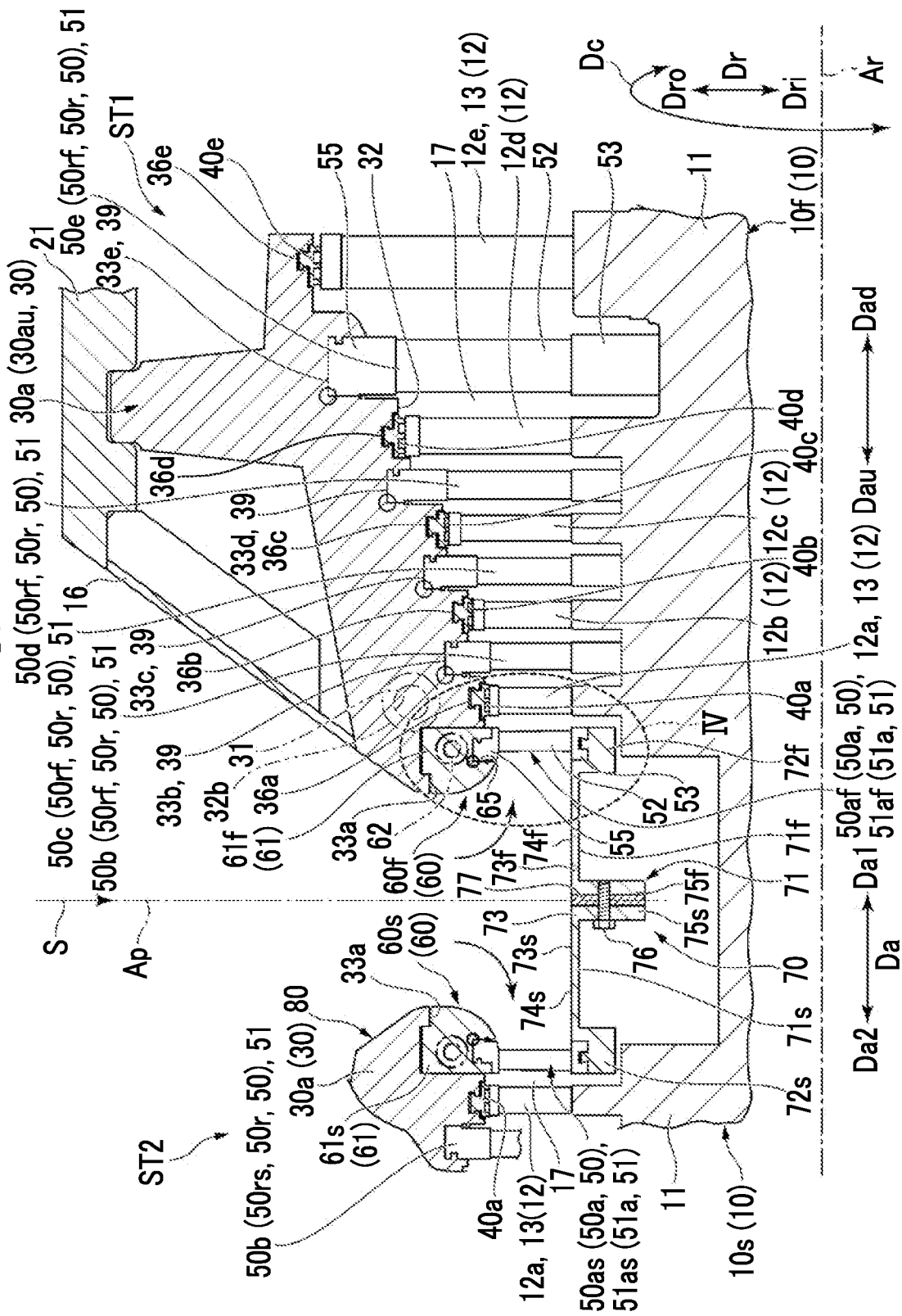
FIG. 2 is an enlarged view of part II in FIG. 1.

As shown in FIG. 2, each of the rotors 10 of the first steam turbine section ST1 and the second steam turbine section ST2 has a rotor shaft 11 extending in the axis direction Da with the axis Ar as a center, and a plurality of rotor blade rows 12 fixed to an outer periphery of the rotor shaft 11 and arranged in the axis direction Da. The bearing 15 (refer to FIG. 1) that rotatably supports the rotor shaft 11 is provided at a portion on the axis downstream side Dad of the rotor shaft 11. Each of the rotor blade rows 12 includes a plurality of rotor blades 13 arranged in a circumferential direction Dc with respect to the axis Ar. The rotor blade 13 has a blade body that has an airfoil shape in a cross-sectional shape perpendicular to a radial direction Dr with respect to the axis Ar and that extends in the radial direction Dr. The plurality of stationary blade rows 50 are arranged in the axis direction Da. One stationary blade row 50, among the plurality of stationary blade rows 50, is disposed at a position on the axis upstream side Dau of each rotor blade row 12. Each of the stationary blade rows 50 includes a plurality of stationary blades 51 arranged in the circumferential direction Dc.

The stationary blade 51 has a blade body 52, an inner shroud 53, and an outer shroud 55. The blade body 52 has an airfoil shape in a cross-sectional shape perpendicular to the radial direction Dr and extends in the radial direction Dr. The inner shroud 53 is provided at an end on a radially inner side Dri of the blade body 52. The outer shroud 55 is provided at an end on a radially outer side Dro of the blade body 52. A part of a steam flow path 17 through which steam S flows is formed between the inner shroud 53 and the outer shroud 55. Therefore, the blade body 52 is disposed within the steam flow path 17.

Here, the stationary blade row 50 on the most axis upstream side Dau, among the plurality of stationary blade rows 50 arranged in the axis direction Da, is referred to as a first-stage stationary blade row 50a. Further, the plurality of stationary blade rows 50 excluding the first-stage stationary blade row 50a, among the plurality of stationary blade rows 50 arranged in the axis direction Da, are referred to as rear-stage stationary blade rows 50r. In the present embodiment, a plurality of rear-stage stationary blade rows 50r include a second-stage stationary blade row 50b, a third-stage stationary blade row 50c, a fourth-stage stationary blade row 50d, a fifth-stage stationary blade row 50e, a sixth-stage stationary blade row 50f (refer to FIG. 3), and a seventh-stage stationary blade row 50g (refer to FIG. 3).

Further, as shown in FIG. 1, the rotor 10 of the first steam turbine section ST1 is referred to as a first rotor 10f, and the rotor 10 of the second steam turbine section ST2 is referred to as a second rotor 10s. As shown in FIG. 2, the first-stage stationary blade row 50a of the first steam turbine section ST1 is referred to as a first first-stage stationary blade row 50af, and the first-stage stationary blade row 50a of the second steam turbine section ST2 is referred to as a second first-stage stationary blade row 50as. The plurality of rear-stage stationary blade rows 50r of the first steam turbine section ST1 are referred to as a plurality of first rear-stage stationary blade rows 50rf, and the plurality of rear-stage stationary blade rows 50r of the second steam turbine section ST2 are referred to as a plurality of second rear-stage stationary blade rows 50rs. Further, the casing 20 of the first steam turbine section ST1 is referred to as a first casing 20f, and the casing 20 of the second steam turbine section ST2 is referred to as a second casing 20s. As described above, the first steam turbine section ST1 and the second steam turbine section ST2 have the same shape and structure. Therefore, in the following section, the first steam turbine section ST1 will be mainly described. Further, in the following section, in a case where a constituent element is not distinguished using expressions "first" and "second", it indicates the constituent element of each of the first steam turbine section ST1 and the second steam turbine section ST2.

Figure 3:
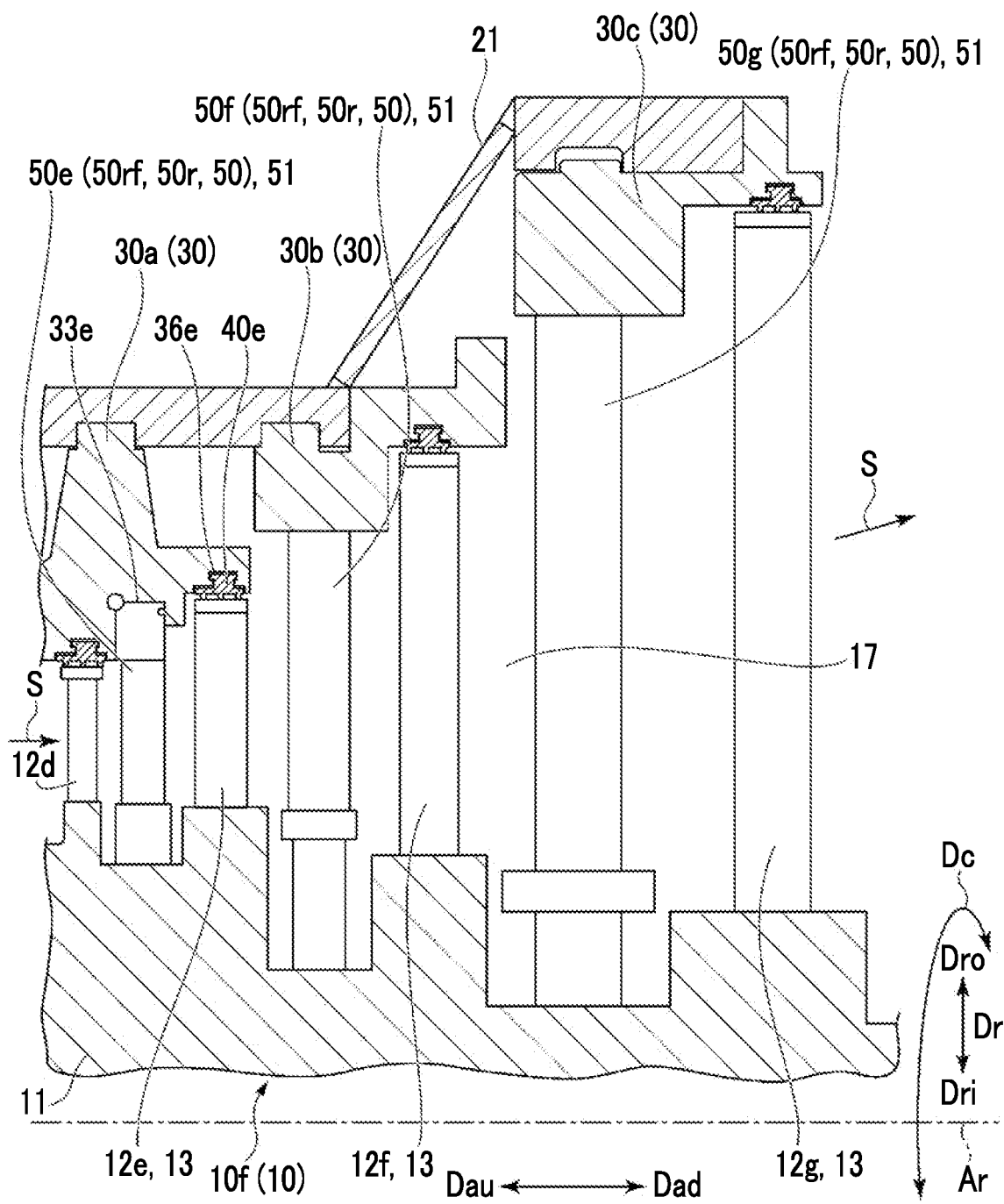
FIG. 3 is an enlarged view of part III in FIG. 1.

Each of the casings 20 of the first steam turbine section ST1 and the second steam turbine section ST2 includes an inner casing 21, an exhaust casing 22, and three blade rings 30. Each of the three blade rings 30 has a tubular shape centered on the axis Ar. Further, the three blade rings 30 are arranged in the axis direction Da. As shown in FIG. 2, the first-stage stationary blade row 50a, the second-stage stationary blade row 50b, the third-stage stationary blade row 50c, the fourth-stage stationary blade row 50d, and the fifth-stage stationary blade row 50e are mounted on a first blade ring 30a, which is the blade ring 30 on the most axis upstream side Dau, among the three blade rings 30. As shown in FIG. 3, the sixth-stage stationary blade row 50f is mounted on a second blade ring 30b adjacent to the axis downstream side Dad of the first blade ring 30a, among the three blade rings 30. The seventh-stage stationary blade row 50g is mounted on a third blade ring 30c adjacent to the axis downstream side Dad of the second blade ring 30b, among the three blade rings 30. Each of the three blade rings 30 includes a semi-arc-shaped upper half blade ring that configures a portion above the axis Ar, and a semi-arc-shaped lower half blade ring that configures a portion below the axis Ar.

The inner casing 21 has a tubular shape centered on the axis Ar, as shown in FIG. 1. The plurality of blade rings 30 are mounted on an inner periphery side of the inner casing 21. The exhaust casing 22 has a diffuser 23, a downstream-side end plate 24, an upstream-side end plate 25, and a side peripheral plate 26.

The diffuser 23 forms an annular shape with respect to the axis Ar, and forms a diffuser space 23s that gradually widens to the radially outer side Dro toward the axis downstream side Dad. The steam S that has passed through a last-stage rotor blade row 12g of the rotor 10 flows into the diffuser space 23s. The last-stage rotor blade row 12g is a rotor blade row disposed on the most axis downstream side Dad, among the plurality of rotor blade rows 12.

The exhaust casing 22 has a discharge port 27. The discharge port 27 is open vertically downward from the inside toward the radially outer side Dro. A condenser C for converting the steam S back to water is connected to the discharge port 27. The downstream-side end plate 24, the upstream-side end plate 25, and the side peripheral plate 26 of the exhaust casing 22 form an exhaust space 22s through which the steam S that has passed through the diffuser space 23s flows. The exhaust space 22s extends in the circumferential direction Dc with respect to the axis Ar on an outer periphery of the diffuser 23, and leads the steam S that has flowed in from the diffuser space 23s to the discharge port 27.

The downstream-side end plate 24 defines an edge on the axis downstream side Dad of the exhaust space 22s. The downstream-side end plate 24 is substantially perpendicular to the axis Ar. The portion above the axis Ar of the downstream-side end plate 24 has a substantially semicircular shape when viewed in the axis direction Da. Meanwhile, the portion below the axis Ar of the downstream-side end plate 24 has a substantially rectangular shape when viewed in the axis direction Da. The lower edge of the downstream-side end plate 24 forms a part of the edge of the discharge port 27.

The upstream-side end plate 25 is disposed on the axis upstream side Dau with respect to the diffuser 23. The upstream-side end plate 25 defines an edge on the axis upstream side Dau of the exhaust space 22s. The upstream-side end plate 25 is substantially perpendicular to the axis Ar. Therefore, the upstream-side end plate 25 faces the downstream-side end plate 24 with a gap therebetween in the axis direction Da. The inner casing 21 is connected to an edge on the radially inner side Dri of the upstream-side end plate 25. The lower edge of the upstream-side end plate 25 forms a part of the edge of the discharge port 27.

The side peripheral plate 26 is connected to an edge on the radially outer side Dro of the downstream-side end plate 24 and an edge on the radially outer side Dro of the upstream-side end plate 25, extends in the axis direction Da, and extends in the circumferential direction Dc with the axis Ar as a center to define an edge portion of the radially outer side Dro of the exhaust space 22s. The side peripheral plate 26 has a semi-cylindrical shape in which an upper side forms a semi-cylinder. The lower edge of the side peripheral plate 26 forms a part of the edge of the discharge port 27.

The exhaust casing 22 of the first steam turbine section ST1 and the exhaust casing 22 of the second steam turbine section ST2 are connected and integrated with each other.

The steam inlet duct 16 has a tubular shape centered on a duct axis Ap. The duct axis Ap extends in a vertical direction through an intermediate position between the first first-stage stationary blade row 50af and the second first-stage stationary blade row 50as in the axis direction Da. The steam inlet duct 16 is disposed on an upper side with respect to the axis Ar. The inner casing 21 and the side peripheral plate 26 of the first steam turbine section ST1 are connected to the first side Da1 of the steam inlet duct 16. Further, the inner casing 21 and the side peripheral plate 26 of the second steam turbine section ST2 are connected to the second side Da2 of the steam inlet duct 16.

Figure 4:
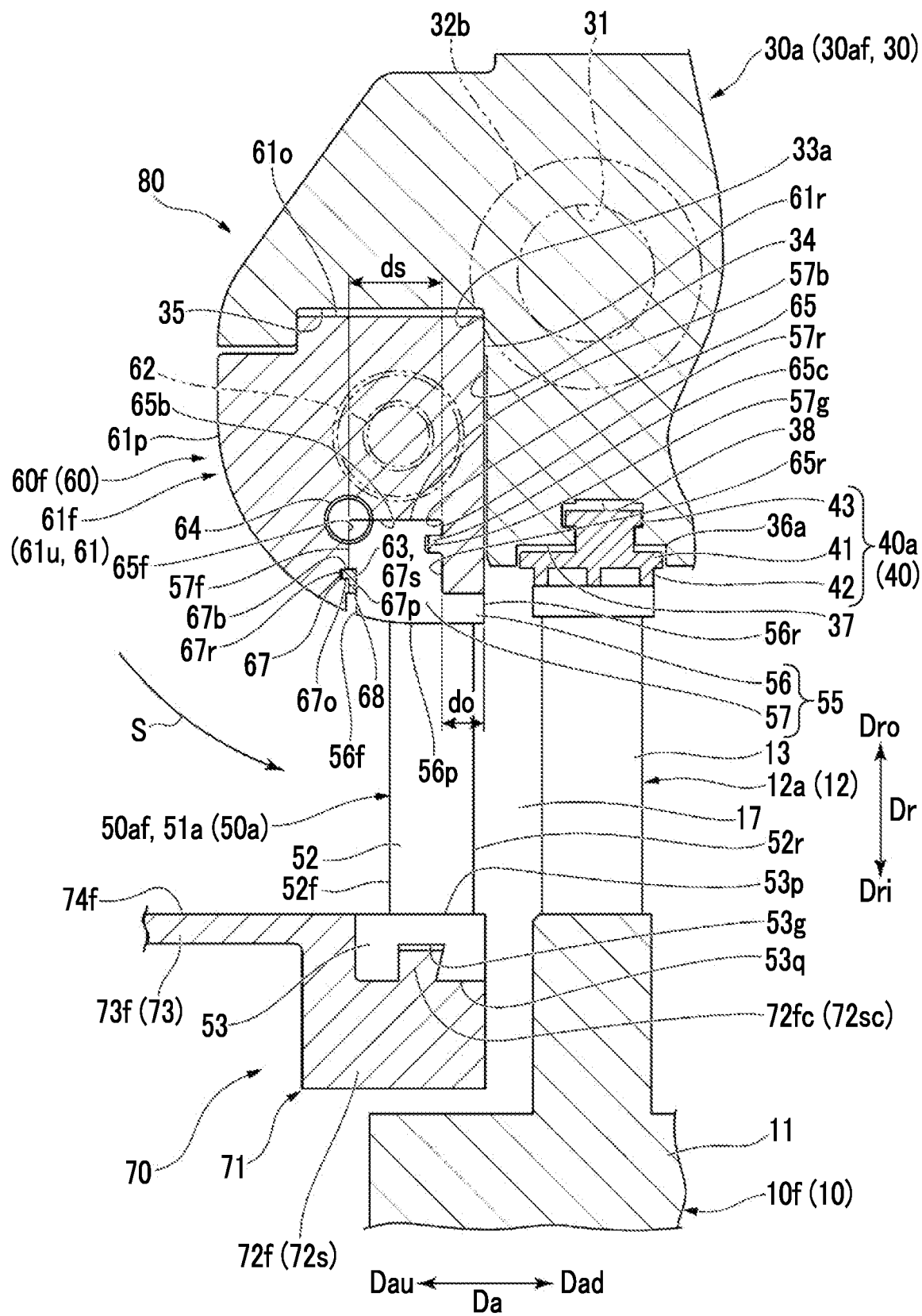
FIG. 4 is an enlarged view of part IV in FIG. 2.

As shown in FIGS. 2 and 4, the first blade ring 30a has a blade ring gas path surface 32 that faces the radially inner side Dri, an outer ring mounting portion 33a, a first-stage seal ring mounting portion 36a, a second-stage stationary blade row mounting portion 33b, a second-stage seal ring mounting portion 36b, a third-stage stationary blade row mounting portion 33c, a third-stage seal ring mounting portion 36c, a fourth-stage stationary blade row mounting portion 33d, a fourth-stage seal ring mounting portion 36d, a fifth-stage stationary blade row mounting portion 33e, and a fifth-stage seal ring mounting portion 36e. The outer ring mounting portion 33a, the first-stage seal ring mounting portion 36a, the second-stage stationary blade row mounting portion 33b, the second-stage seal ring mounting portion 36b, the third-stage stationary blade row mounting portion 33c, the third-stage seal ring mounting portion 36c, the fourth-stage stationary blade row mounting portion 33d, the fourth-stage seal ring mounting portion 36d, the fifth-stage stationary blade row mounting portion 33e, and the fifth-stage seal ring mounting portion 36e are arranged in the above order from the axis upstream side Dau toward the axis downstream side Dad. Further, all of the outer ring mounting portion 33a, the first-stage seal ring mounting portion 36a, the second-stage stationary blade row mounting portion 33b, the second-stage seal ring mounting portion 36b, the third-stage stationary blade row mounting portion 33c, the third-stage seal ring mounting portion 36c, the fourth-stage stationary blade row mounting portion 33d, the fourth-stage seal ring mounting portion 36d, the fifth-stage stationary blade row mounting portion 33e, and the fifth-stage seal ring mounting portion 36e are recessed from the blade ring gas path surface 32 toward the radially outer side Dro.

As described above, the first blade ring 30a has a semi-arc-shaped first upper half blade ring 30au that configures a portion above the axis Ar, and a semi-arc-shaped first lower half blade ring that configures a portion below the axis Ar. An end portion of the first upper half blade ring 30au in the circumferential direction Dc and an end portion of the first lower half blade ring in the circumferential direction Dc are connected by a blade ring connecting bolt 32b. Bolt holes 31 into which the blade ring connecting bolt 32b is inserted are formed in a region in the axis direction Da where the first-stage seal ring mounting portion 36a is disposed, and in a region on the radially outer side Dro with respect to the first-stage seal ring mounting portion 36a, in both end regions in the circumferential direction Dc of each of the first upper half blade ring 30au and the first lower half blade ring.

As shown in FIG. 4, the outer ring mounting portion 33a has a mounting side surface 34 and a mounting inner peripheral surface 35. The mounting side surface 34 extends from a position on the axis upstream side Dau with respect to the first-stage seal ring mounting portion 36a toward the radially outer side Dro in the blade ring gas path surface 32 and extends in the circumferential direction Dc. The mounting inner peripheral surface 35 extends from an edge on the radially outer side Dro of the mounting side surface 34 toward the axis upstream side Dau and extends in the circumferential direction Dc. An outer ring 61 of a first-stage stationary blade segment 60 is mounted on the outer ring mounting portion 33a.

The first-stage stationary blade segment 60 includes the outer ring 61 extending in the circumferential direction Dc with the axis Ar as a center, the first-stage stationary blade row 50a mounted on the radially inner side Dri of the outer ring 61, a caulking member 63, and a plurality of setscrews 64. A stationary unit 80 is configured to include the first-stage stationary blade segment 60 and the first blade ring 30a.

Figure 5:
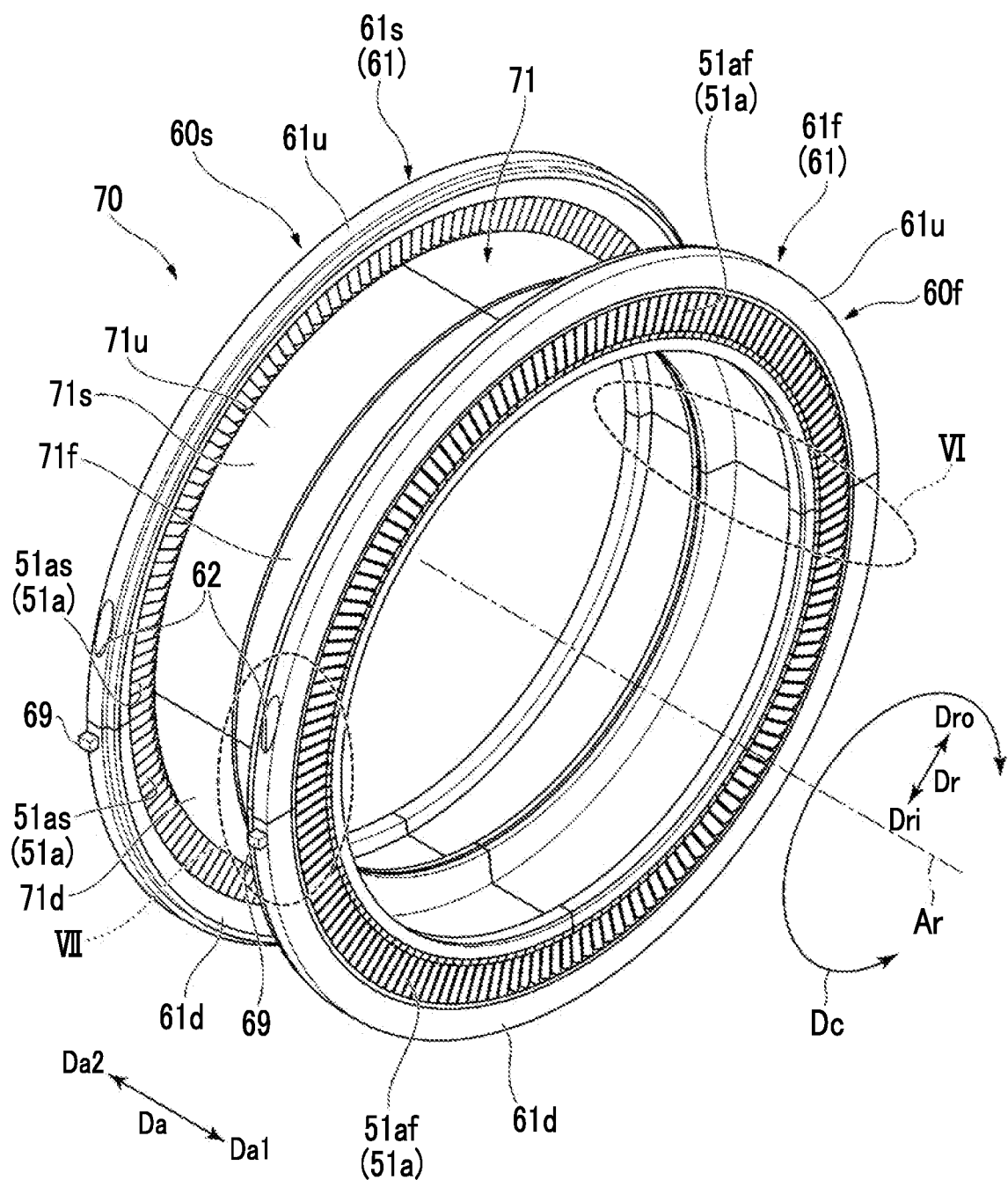
FIG. 5 is a perspective view of a first-stage stationary blade segment unit in an embodiment according to the present disclosure.
Figure 7:
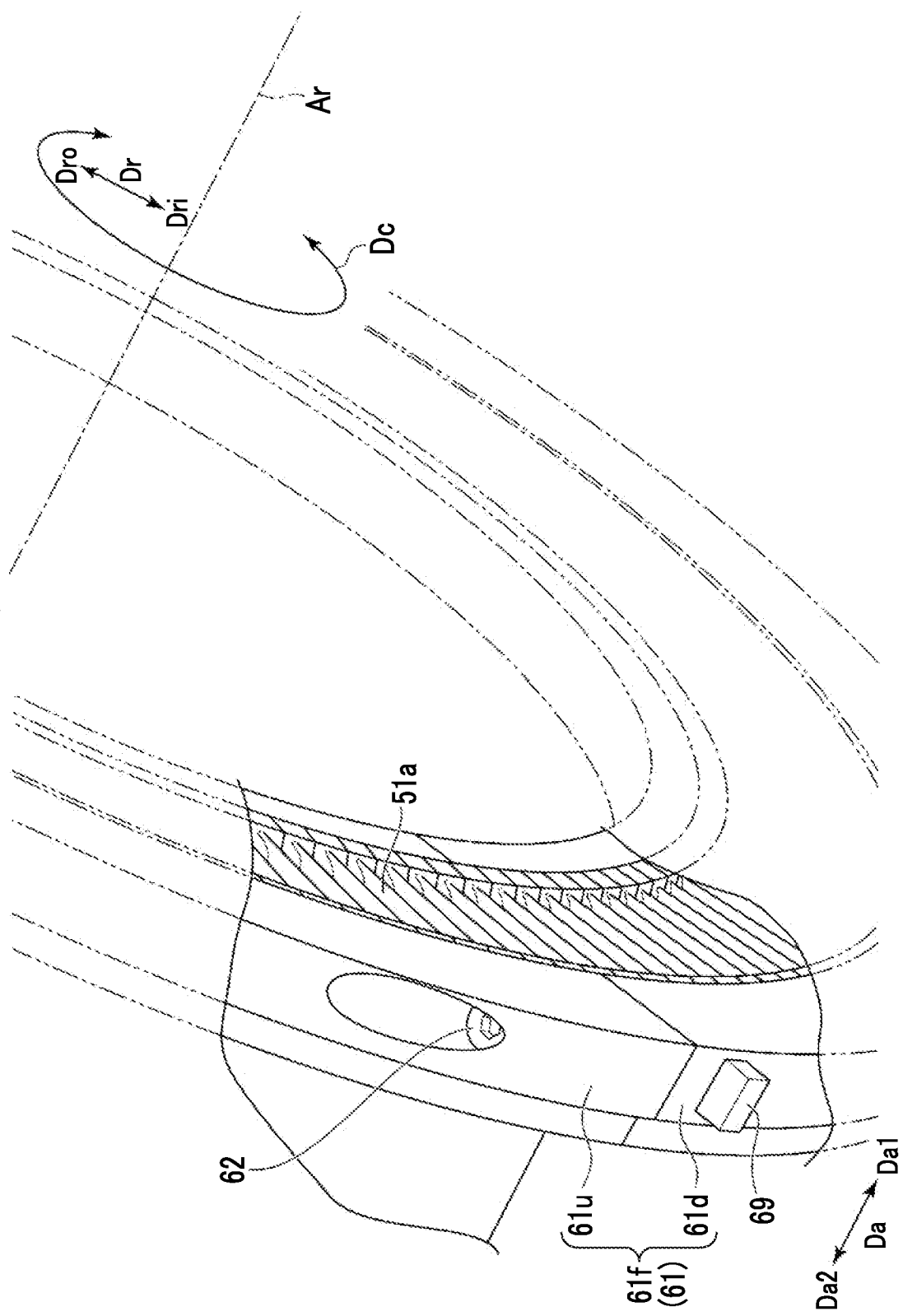
FIG. 7 is an enlarged view of part VII in FIG. 5.

As shown in FIG. 5, the outer ring 61 of the first-stage stationary blade segment 60 also has a semi-arc-shaped upper half outer ring 61u that configures a portion above the axis Ar, and a semi-arc-shaped lower half outer ring 61d that configures a portion below the axis Ar. As shown in FIGS. 5 and 7, an end portion of the upper half outer ring 61u in the circumferential direction Dc and an end portion of the lower half outer ring 61d in the circumferential direction Dc are connected to each other by an outer ring connecting bolt 62. The first-stage stationary blade row 50a described above is composed of a plurality of first-stage stationary blades 51a mounted on the upper half outer ring 61u and a plurality of first-stage stationary blades 51a mounted on the lower half outer ring 61d. Further, the upper half outer ring 61u is mounted on the outer ring mounting portion 33a in the first upper half blade ring 30au, and the lower half outer ring 61d is mounted on the outer ring mounting portion 33a in the first lower half blade ring. Support plates 69 protruding from the lower half outer ring 61d toward the radially outer side Dro are provided at both end portions of the lower half outer ring 61d in the circumferential direction Dc. The lower half outer ring 61d to which the upper half outer ring 61u is connected by the outer ring connecting bolt 62 is supported by the first lower half blade ring through the support plate 69.

The first-stage stationary blade 51a has the blade body 52, the inner shroud 53, and the outer shroud 55, as described above. As shown in FIG. 4, the blade body 52 has a leading edge 52f that forms an edge on the axis upstream side Dau, and a trailing edge 52r that forms an edge on the axis downstream side Dad.

The inner shroud 53 of the first-stage stationary blade 51a has an inner gas path surface 53p, a counter-gas path surface 53q, and a connection groove 53g. The inner gas path surface 53p faces the radially outer side Dro, and the blade body 52 is connected thereto. The inner gas path surface 53p is a surface that defines a part of the steam flow path 17. The counter-gas path surface 53q faces the radially inner side Dri and is in a back-to-back relationship with the inner gas path surface 53p. The connection groove 53g is recessed from the counter-gas path surface 53q toward the radially outer side Dro and extends in the circumferential direction Dc. The connection groove 53g is formed such that a groove width in the axis direction Da gradually increases toward the radially outer side Dro. That is, the connection groove 53g is a dovetail groove.

The outer shroud 55 of the first-stage stationary blade 51a has a shroud main body 56 and an embedded portion 57 connected to the radially outer side Dro of the shroud main body 56. The shroud main body 56 has an outer gas path surface 56p, a shroud front end surface 56f, and a shroud rear end surface 56r. The outer gas path surface 56p faces the radially inner side Dri, and the blade body 52 is connected thereto. The outer gas path surface 56p is a surface that defines a part of the steam flow path 17. The shroud front end surface 56f faces the axis upstream side Dau and extends from an edge on the axis upstream side Dau of the outer gas path surface 56p toward the radially outer side Dro. The shroud rear end surface 56r faces the axis downstream side Dad and extends from an edge on the axis downstream side Dad of the outer gas path surface 56p toward the radially outer side Dro. The embedded portion 57 has an embedded front end surface 57f, an embedded rear end surface 57r, an embedded bottom surface 57b, and an engaging groove 57g. The embedded front end surface 57f faces the axis upstream side Dau and is located on the axis upstream side Dau with respect to the leading edge 52f of the blade body 52. The embedded rear end surface 57r faces the axis downstream side Dad, is in a back-to-back relationship with the embedded front end surface 57f, and is located on the axis upstream side Dau with respect to the trailing edge 52r of the blade body 52. The embedded bottom surface 57b faces the radially outer side Dro and connects the embedded front end surface 57f and the embedded rear end surface 57r. The engaging groove 57g is recessed from the embedded rear end surface 57r toward the axis upstream side Dau and extends in the circumferential direction Dc.

The outer ring 61 has an outer ring groove 65 into which the outer shroud 55 of each of the plurality of first-stage stationary blades 51a enters, an outer ring gas path surface 61p, an outer ring rear end surface 61r, and an outer ring outer peripheral surface 61o. The outer ring groove 65 has a groove front side surface 65f that faces the axis downstream side Dad and that faces the embedded front end surface 57f, a groove rear side surface 65r that faces the axis upstream side Dau and that faces the embedded rear end surface 57r, a groove bottom surface 65b that faces the radially inner side Dri and that faces the embedded bottom surface 57b, and a protrusion portion 65c. The protrusion portion 65c protrudes from the groove rear side surface 65r toward the axis upstream side Dau and extends in the circumferential direction Dc. The protrusion portion 65c is fitted into each of the engaging grooves 57g of the embedded portions 57 in the plurality of first-stage stationary blades 51a. The outer ring gas path surface 61p has a curved surface so as to gradually extend toward the axis downstream side Dad toward the radially inner side Dri from a position on the axis upstream side Dau with respect to the groove front side surface 65f and on the radially outer side Dro with respect to the groove bottom surface 65b, and is continuous with the outer gas path surface 56p. The outer ring gas path surface 61p has a curved surface so as to gradually extend toward the axis downstream side Dad toward the radially inner side Dri from the position on the axis upstream side Dau with respect to the groove front side surface 65f and on the radially outer side Dro with respect to the outer gas path surface 56p, and is continuous with the outer gas path surface 56p. The outer ring gas path surface 61p may gradually extend toward the axis downstream side Dad toward the radially inner side Dri from the position on the axis upstream side Dau with respect to the groove front side surface 65f and on the radially outer side Dro with respect to the groove bottom surface 65b. The outer ring groove 65 described above is recessed from an end on the axis downstream side Dad of the outer ring gas path surface 61p toward the radially outer side Dro and extends in the circumferential direction Dc. The outer ring rear end surface 61r faces the axis downstream side Dad and is located on the axis downstream side Dad with respect to the outer ring groove 65. The outer ring rear end surface 61r faces the mounting side surface 34 of the first blade ring 30a in the axis direction Da. The outer ring outer peripheral surface 61o faces the radially outer side Dro and connects an edge on the radially outer side Dro of the outer ring gas path surface 61p and an edge on the radially outer side Dro of the outer ring rear end surface 61r. The outer ring outer peripheral surface 61o faces the mounting inner peripheral surface 35 of the first blade ring 30a in the radial direction Dr.

A maximum distance do in the axis direction Da between the groove rear side surface 65r and the outer ring rear end surface 61r in the outer ring 61 is smaller than a minimum distance ds in the axis direction Da between the embedded front end surface 57f and the embedded rear end surface 57r in the outer shroud 55. Further, the outer ring rear end surface 61r is flush with the shroud rear end surface 56r. The expression "being flush" is applied to not only a case where the outer ring rear end surface 61r and the shroud rear end surface 56r are located on the same virtual plane, but also to a case where a first virtual plane that includes the outer ring rear end surface 61r and a second virtual plane that includes the shroud rear end surface 56r are parallel to each other and the distance between the first virtual plane and the second virtual plane is within 2 mm, for example.

The outer ring 61 further has a storage space forming portion 67. The storage space forming portion 67 is connected to an end on the radially inner side Dri of the groove front side surface 65f. The storage space forming portion 67 forms a storage space 67s, into which the caulking member 63 enters, in cooperation with the outer shrouds 55 of the plurality of first-stage stationary blades 51a. The storage space 67s is open on the radially inner side Dri.

The storage space forming portion 67 has a space bottom surface 67b, a space back surface 67r, a space bottom facing surface 67o, and a space side surface 67p. The space bottom surface 67b faces the radially inner side Dri, extends in the circumferential direction Dc, and extends from the end on the radially inner side Dri of the groove front side surface 65f toward the axis upstream side Dau. The space back surface 67r faces the axis downstream side Dad, extends in the circumferential direction Dc, and extends from an end on the axis upstream side Dau of the space bottom surface 67b toward the radially inner side Dri. The space bottom facing surface 67o faces the radially outer side Dro, extends in the circumferential direction Dc, and extends from an end on the radially inner side Dri of the space back surface 67r toward the axis downstream side Dad. The space bottom facing surface 67o faces the space bottom surface 67b in the radial direction Dr. The space side surface 67p faces the axis downstream side Dad, extends in the circumferential direction Dc, and extends from an end on the axis downstream side Dad of the space bottom facing surface 67o toward the radially inner side Dri. An end on the radially inner side Dri of the space side surface 67p forms a part of an edge of an opening 68 of the storage space 67s.

The storage space 67s is defined by the surfaces 67b, 67o, 67p, and 67r of the storage space forming portion 67 and by the outer shroud 55 entering into the outer ring groove 65. The cross-sectional shape perpendicular to the circumferential direction Dc of the storage space 67s is an L shape. The caulking member 63 is made of metal that is softer than the metal forming the stationary blade 51. The caulking member 63 is inserted into the storage space 67s from the opening 68 of the storage space 67s after the outer shrouds 55 of the plurality of first-stage stationary blades 51a are inserted into the outer ring groove 65. At this time, the caulking member 63 is hit with a hammer or the like to be put in the storage space 67s. If the caulking member 63 is accommodated in the storage space 67s, the caulking member 63 comes into contact with the surfaces 67b, 67o, 67p, and 67r of the storage space forming portion 67 and comes into contact with the outer shroud 55. Therefore, the cross-sectional shape perpendicular to the circumferential direction Dc of the caulking member 63 has an L shape such that the caulking member 63 is accommodated in the L-shaped storage space 67s. A part of the caulking member 63 is exposed from the opening 68 of the storage space 67s. The caulking member 63 plays a role of restraining the relative movement of the plurality of first-stage stationary blades 51a in the axis direction Da and the radial direction Dr with respect to the outer ring groove 65.

The setscrew 64 described above is screwed into the first-stage stationary blade 51a located at an end in the circumferential direction Dc, among the plurality of first-stage stationary blades 51a mounted on the upper half outer ring 61u, and into the upper half outer ring 61u. Further, another setscrew 64 is screwed into the first-stage stationary blade 51a located at an end in the circumferential direction Dc, among the plurality of first-stage stationary blades 51a mounted on the lower half outer ring 61d, and into the lower half outer ring 61d. These setscrews 64 play a role of restraining the relative movement of the plurality of first-stage stationary blades 51a in the circumferential direction Dc with respect to the outer ring groove 65.

As shown in FIG. 2, a first-stage seal ring 40a is mounted on the first-stage seal ring mounting portion 36a. A second-stage seal ring 40b is mounted on the second-stage seal ring mounting portion 36b. A third-stage seal ring 40c is mounted on the third-stage seal ring mounting portion 36c. A fourth-stage seal ring 40d is mounted on the fourth-stage seal ring mounting portion 36d. A fifth-stage seal ring 40e is mounted on the fifth-stage seal ring mounting portion 36e. A first-stage rotor blade row 12a, among the plurality of rotor blade rows 12 of the rotor 10, faces the first-stage seal ring 40a in the radial direction Dr. A second-stage rotor blade row 12b, among the plurality of rotor blade rows 12 of the rotor 10, faces the second-stage seal ring 40b in the radial direction Dr. A third-stage rotor blade row 12c, among the plurality of rotor blade rows 12 of the rotor 10, faces the third-stage seal ring 40c in the radial direction Dr. A fourth-stage rotor blade row 12d, among the plurality of rotor blade rows 12 of the rotor 10, faces the fourth-stage seal ring 40d in the radial direction Dr. A fifth-stage rotor blade row 12e, among the plurality of rotor blade rows 12 of the rotor 10, faces the fifth-stage seal ring 40e in the radial direction Dr.

As shown in FIG. 4, each seal ring has a seal ring base 41 having a tubular shape centered on the axis Ar, a plurality of fins 42 protruding from an inner peripheral surface of the seal ring base 41 toward the radially inner side Dri and extending in the circumferential direction Dc, and a pair of base support legs 43 protruding from an outer peripheral surface of the seal ring base 41 toward the radially outer side Dro and extending in the circumferential direction Dc. Each of the seal ring mounting portions 36a to 36b has a base storage groove 37 recessed from the blade ring gas path surface 32 toward the radially outer side Dro and extending in the circumferential direction Dc, and a leg storage groove 38 recessed from the groove bottom surface of the base storage groove 37 toward the radially outer side Dro and extending in the circumferential direction Dc. The seal ring base 41 is accommodated in the base storage groove 37 so as to be movable in the radial direction Dr. The pair of base support legs 43 are accommodated in the leg storage groove 38 so as to be movable in the radial direction Dr.

The entire outer ring mounting portion 33a described above is located on the axis upstream side Dau with respect to the first-stage seal ring mounting portion 36a described above.

The second-stage stationary blade row 50b is mounted on the second-stage stationary blade row mounting portion 33b. The third-stage stationary blade row 50c is mounted on the third-stage stationary blade row mounting portion 33c. The fourth-stage stationary blade row 50d is mounted on the fourth-stage stationary blade row mounting portion 33d. The fifth-stage stationary blade row 50e is mounted on the fifth-stage stationary blade row mounting portion 33e. Each of the stationary blade row mounting portions 33b to 33e has a blade ring groove 39 into which the outer shroud 55 of the stationary blade 51 is fitted. The restraining structure of the outer shroud 55 with respect to the blade ring groove 39 is substantially the same as the restraining structure of the outer shroud 55 of the first-stage stationary blade 51a with respect to the outer ring groove 65. That is, the outer shroud 55 is restrained so as not to be relatively movable with respect to the blade ring groove 39 by using the caulking member and the connecting bolt.

Here, as shown in FIGS. 2 and 5, the first-stage stationary blade segment 60 of the first steam turbine section ST1 is referred to as a first first-stage stationary blade segment 60f, and the first-stage stationary blade segment 60 of the second steam turbine section ST2 is referred to as a second first-stage stationary blade segment 60s. The second first-stage stationary blade segment 60s is disposed to be spaced apart from the first first-stage stationary blade segment 60f toward the second side Da2. The second first-stage stationary blade segment 60s has the same shape and structure as the first first-stage stationary blade segment 60f. Therefore, the second first-stage stationary blade segment 60s includes a second outer ring 61s having the same shape and structure as a first outer ring 61f which is the outer ring 61 in the first first-stage stationary blade segment 60f, a plurality of second first-stage stationary blades 51as having the same shape and structure as a plurality of first first-stage stationary blades 51af which are the plurality of first-stage stationary blades 51a in the first first-stage stationary blade segment 60f, a caulking member 63 having the same shape and structure as the caulking member 63 in the first first-stage stationary blade segment 60f, and a plurality of setscrews 64. However, the axis upstream side Dau in the second first-stage stationary blade segment 60s is the first side Da1 in the axis direction Da, and the axis downstream side Dad in the second first-stage stationary blade segment 60s is the second side Da2 in the axis direction Da.

A first-stage stationary blade segment unit 70 includes the diverting member 71 described above, and the first first-stage stationary blade segment 60f and the second first-stage stationary blade segment 60s described above. The diverting member 71 has a tubular shape centered on the axis Ar, and connects the first first-stage stationary blade segment 60f and the second first-stage stationary blade segment 60s. As shown in FIG. 5, the diverting member 71 includes an upper half diverting member 71u that configures a portion above the axis Ar, and a lower half diverting member 71d that configures a portion below the axis Ar. The upper half diverting member 71u connects the plurality of first first-stage stationary blades 51af mounted on the upper half outer ring 61u of the first first-stage stationary blade segment 60f and the plurality of second first-stage stationary blades 51*as* mounted on the upper half outer ring 61*u* of the second first-stage stationary blade segment 60*s*. Further, the lower half diverting member 71*d* connects the plurality of first first-stage stationary blades 51*af* mounted on the lower half outer ring 61*d* of the first first-stage stationary blade segment 60*f* and the plurality of second first-stage stationary blades 51*as* mounted on the lower half outer ring 61*d* of the second first-stage stationary blade segment 60*s*. Each of the upper half diverting member 71*u* and the lower half diverting member 71*d* has a first diverting member 71*f*, a second diverting member 71*s*, and a connector 76.

Figure 6:
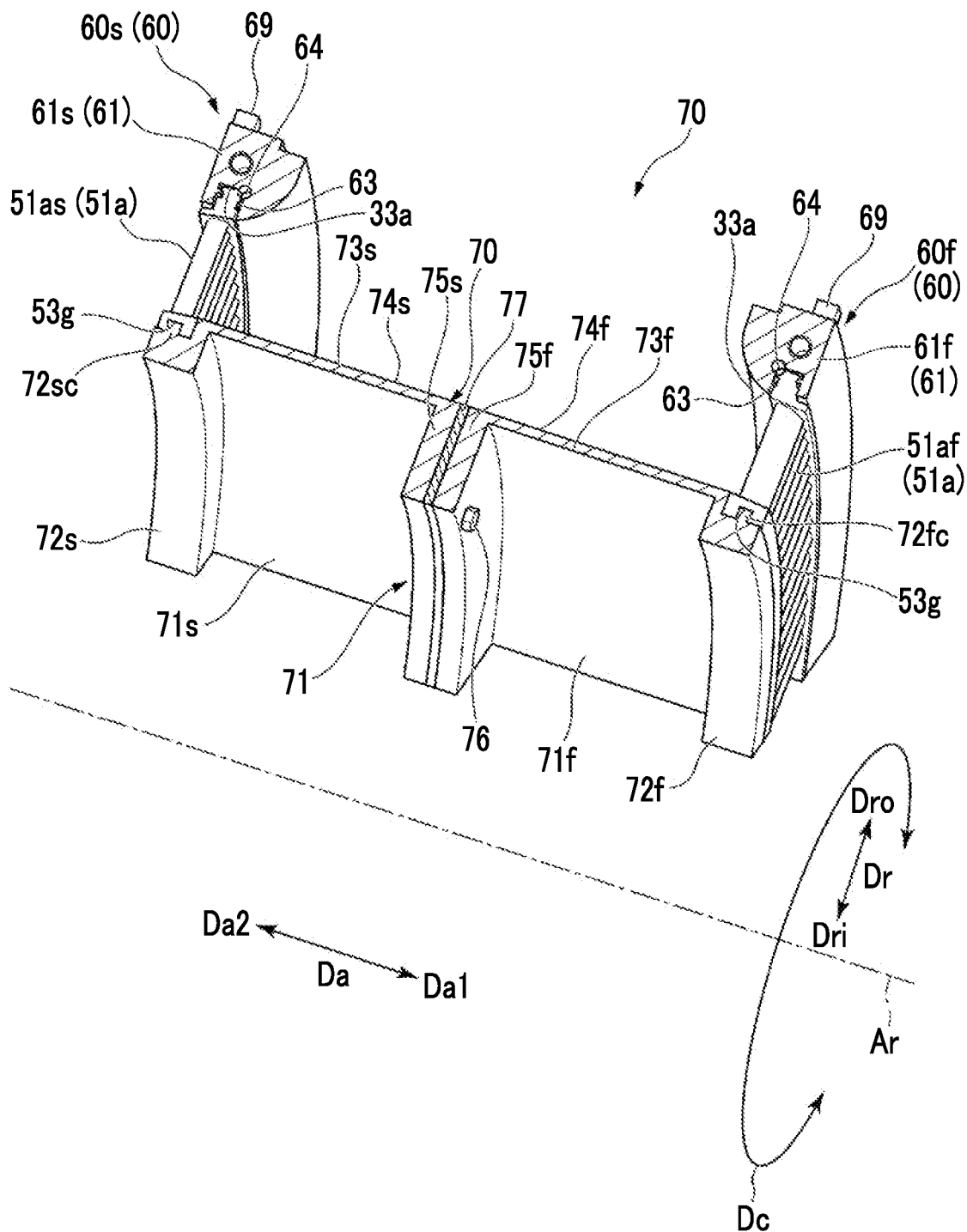
FIG. 6 is an enlarged view of part VI in FIG. 5.

As shown in FIGS. 2, 4, and 6, the first diverting member 71*f* has a first connecting portion 72*f* that is connected to the inner shroud 53 of each of the plurality of first first-stage stationary blades 51*af*, and a first main body 73*f* extending from the first connecting portion 72*f* toward the second side Da2. The first main body 73*f* has a first gas path surface 74*f* and a first flange 75*f*. The first gas path surface 74*f* faces the radially outer side Dro and extends from the first connecting portion 72*f* toward the second side Da2 in the axis direction Da. The first gas path surface 74*f* is continuous with the inner gas path surface 53*p* of each of the plurality of first first-stage stationary blades 51*af*. The first flange 75*f* protrudes from an end on the second side Da2 of the first gas path surface 74*f* toward the radially inner side Dri. The first connecting portion 72*f* has a protrusion portion 72*fc* that is fitted into the connection groove 53*g* of the inner shroud 53 of each of the plurality of first first-stage stationary blades 51*af*. The protrusion portion 72*fc* is formed such that a protrusion width in the axis direction Da gradually increases toward the radially outer side Dro, like the shape of the connection groove 53*g*.

The second diverting member 71*s* has a second connecting portion 72*s* that is connected to the inner shroud 53 of each of the plurality of second first-stage stationary blades 51*as*, and a second main body 73*s* extending from the second connecting portion 72*s* toward the first side Da1. The second main body 73*s* has a second gas path surface 74*s* and a second flange 75*s*. The second gas path surface 74*s* faces the radially outer side Dro and extends from the second connecting portion 72*s* toward the first side Da1 in the axis direction Da. The second gas path surface 74*s* is continuous with the inner gas path surface 53*p* of each of the plurality of second first-stage stationary blades 51*as*. The second flange 75*s* protrudes from an end on the first side Da1 of the second gas path surface 74*s* toward the radially inner side Dri. The second connecting portion 72*s* has a protrusion portion 72*sc* that is fitted into the connection groove 53*g* of the inner shroud 53 of each of the plurality of second first-stage stationary blades 51*as*. The protrusion portion 72*sc* is formed such that a protrusion width in the axis direction Da gradually increases toward the radially outer side Dro, like the shape of the connection groove 53*g*. A main body 73 of the diverting member 71 is composed of the first main body 73*f* and the second main body 73*s*.

The first flange 75*f* of the first diverting member 71*f* and the second flange 75*s* of the second diverting member 71*s* are connected to each other with a spacer 77 interposed therebetween by a bolt that is the connector 76.

A center position in the axis direction Da of the diverting member 71 substantially coincides with the position in the axis direction Da of the duct axis Ap described above. Further, the diverting member 71 is disposed at a position separated from the steam inlet duct 16 toward the radially inner side Dri. In other words, the steam inlet duct 16 is disposed at the position separated from the gas path surfaces 74*f* and 74*s* of the diverting member 71 toward the radially outer side Dro.

The flow of the steam S that has passed through the steam inlet duct 16 is divided into the first side Da1 and the second side Da2 in the axis direction Da due to the gas path surfaces 74*f* and 74*s* of the diverting member 71. The steam S directed toward the first side Da1 flows into the steam flow path 17 of the first steam turbine section ST1. Further, the steam S directed toward the second side Da2 flows into the steam flow path 17 of the second steam turbine section ST2.

As described above, in the first-stage stationary blade segment 60 in the present embodiment, the embedded front end surface 57*f* of the embedded portion 57 in the first-stage stationary blade 51*a* is located on the axis upstream side Dau with respect to the leading edge 52*f* of the blade body 52 of the first-stage stationary blade 51*a*, and the embedded rear end surface 57*r* of the embedded portion 57 is located on the axis upstream side Dau with respect to the trailing edge 52*r* of the blade body 52. Therefore, in the first-stage stationary blade 51*a* of the first-stage stationary blade segment 60 in the present embodiment, the embedded portion 57 is shifted to the axis upstream side Dau with respect to the blade body 52. Therefore, the groove rear side surface 65*r* of the outer ring groove 65 into which the embedded portion 57 of the first-stage stationary blade 51*a* enters can be prevented from being located on the axis upstream side Dau with respect to the trailing edge 52*r* of the blade body 52, and the outer ring rear end surface 61*r* can be prevented from being located on the axis downstream side Dad with respect to the first-stage stationary blade 51*a*. In other words, in the present embodiment, it is possible to reduce protruding portions of the outer ring 61 to the axis downstream side Dad with respect to the first-stage stationary blade 51*a*, or it is possible to eliminate protruding portions of the outer ring 61 to the axis downstream side Dad with respect to the first-stage stationary blade 51*a*. In the present embodiment, since the outer ring rear end surface 61*r* is flush with the shroud rear end surface 56*r*, there is no protruding portion of the outer ring 61 on the axis downstream side Dad with respect to the first-stage stationary blade 51*a*.

Therefore, in the present embodiment, the degree of freedom in designing the first blade ring 30*a* (a part of the casing 20) on which the outer ring 61 is mounted can be increased. In this manner, the degree of freedom in designing the first blade ring 30*a* is increased, so that it is possible to make a part of the first blade ring 30*a* present even within a common region of the region in the axis direction Da where the first-stage rotor blade row 12*a* is present and the region in the radial direction Dr where the outer ring 61 is present. Therefore, in the present embodiment, a part of the first blade ring 30*a* is present in the common region, so that the first-stage seal ring 40*a*, which seals the gap between the blade ring 30 and the first-stage rotor blade 13, is mounted on a part of the first blade ring 30*a* without widening the interval in the axis direction Da between the first-stage stationary blade 51*a* and the first-stage rotor blade 13.

If the interval in the axis direction Da between the first-stage stationary blade 51*a* and the first-stage rotor blade 13 is widened, there is a high probability of reducing turbine efficiency. However, in the present embodiment, as described above, the first-stage seal ring 40*a* can be mounted on a part of the first blade ring 30*a* without widening the interval in the axis direction Da between the first-stage stationary blade 51*a* and the first-stage rotor blade 13. Therefore, in the present embodiment, it is possible to increase the degree of freedom in designing the first blade ring 30a, which is a part of the casing 20, while satisfying requirements such as turbine efficiency.

If the first-stage seal ring 40a can be mounted on a part of the first blade ring 30a instead of on a part of the outer ring 61, the width in the radial direction Dr of the first-stage seal ring mounting portion 36a in the blade ring 30 can be increased, and the first-stage seal ring 40a can be mounted on the blade ring 30 so as to be movable in the radial direction Dr. Moreover, even if the width in the radial direction Dr of the first-stage seal ring mounting portion 36a is increased, the bolt hole 31 into which the blade ring connecting bolt 32b is inserted can be formed in the region on the radially outer side Dro of the first-stage seal ring mounting portion 36a in the first blade ring 30a.

In the present embodiment, even if the outer shroud 55 of each of the plurality of first first-stage stationary blades 51af and the first outer ring 61f are not weld-connected to each other, the outer shroud 55 of each of the plurality of first first-stage stationary blades 51af can be firmly mounted on the first outer ring 61f by the caulking member 63 and the setscrew 64. Further, even if the outer shroud 55 of each of the plurality of second first-stage stationary blades 51as and the second outer ring 61s are not weld-connected to each other, the outer shroud 55 of each of the plurality of second first-stage stationary blades 51as can be firmly mounted on the second outer ring 61s by the caulking member 63 and the setscrew 64. Further, in the present embodiment, even if the inner shroud 53 of each of the plurality of first first-stage stationary blades 51af and the diverting member 71 are not weld-connected to each other, the inner shroud 53 of each of the plurality of first first-stage stationary blades 51af and the diverting member 71 can be firmly connected to each other. Further, in the present embodiment, even if the inner shroud 53 of each of the plurality of second first-stage stationary blades 51as and the diverting member 71 are not weld-connected to each other, the inner shroud 53 of each of the plurality of second first-stage stationary blades 51as and the diverting member 71 can be firmly connected to each other. Therefore, in the present embodiment, the parts that configure the first-stage stationary blade segment unit 70 can be firmly connected to each other without weld-connection.

Further, in the present embodiment, since the diverting member 71 is divided into the first diverting member 71f and the second diverting member 71s, it is not necessary to perform in parallel the work of inserting the protrusion portion 72fc of the first connecting portion 72f of the first diverting member 71f into the connection groove 53g of each of the plurality of first first-stage stationary blades 51af and the work of inserting the protrusion portion 72sc of the second connecting portion 72s of the second diverting member 71s into the connection groove 53g of each of the plurality of second first-stage stationary blades 51as. Therefore, in the present embodiment, the first connecting portion 72f of the diverting member 71 can be easily connected to the plurality of first first-stage stationary blades 51af, and the second connecting portion 72s of the diverting member 71 can be easily connected to the plurality of second first-stage stationary blades 51as.

The first flange 75f of the first diverting member 71f and the second flange 75s of the second diverting member 71s are present at an intermediate portion in the axis direction Da of the diverting member 71. Therefore, these flanges 75f and 75s function as ribs of the main body 73 at an intermediate portion in the axis direction Da of the main body 73 of the diverting member 71. Therefore, in the present embodiment, the rigidity of the diverting member 71 can be increased.

An embodiment of the present disclosure has been described above. However, the present disclosure is not limited to the above embodiment. Various additions, changes, replacements, partial deletions, or the like can be made within a scope which does not depart from the conceptual idea and gist of the present invention which are derived from the contents defined in the claims and equivalents thereof.

ADDITIONAL REMARKS

The first-stage stationary blade segment in the embodiment described above is understood as follows, for example.

(1) A first-stage stationary blade segment in a first aspect includes the outer ring 61 that extends in the circumferential direction Dc with respect to the axis Ar, and the plurality of first-stage stationary blades 51a mounted side by side in the circumferential direction Dc on the radially inner side Dri with respect to the axis Ar of the outer ring 61. Out of the first side Da1 and the second side Da2 in the axis direction Da in which the axis Ar extends, the second side Da2 forms the axis upstream side Dau, and the first side Da1 forms the axis downstream side Dad. Each of the plurality of first-stage stationary blades 51a includes the blade body 52 extending in the radial direction Dr with respect to the axis Ar, the inner shroud 53 formed on the radially inner side Dri of the blade body 52, and the outer shroud 55 formed on the radially outer side Dro with respect to the axis Ar of the blade body 52. The blade body 52 has the leading edge 52f that forms an edge on the axis upstream side Dau, and the trailing edge 52r that forms an edge on the axis downstream side Dad. The inner shroud 53 has the inner gas path surface 53p which faces the radially outer side Dro, and to which the blade body 52 is connected. The outer shroud 55 has the shroud main body 56 having the outer gas path surface 56p which faces the radially inner side Dri and to which the blade body 52 is connected, and the embedded portion 57 connected to the radially outer side Dro of the shroud main body 56. The embedded portion 57 has the embedded front end surface 57f that faces the axis upstream side Dau, the embedded rear end surface 57r that faces the axis downstream side Dad and that is in a back-to-back relationship with the embedded front end surface 57f, and the embedded bottom surface 57b that faces the radially outer side Dro and that connects the embedded front end surface 57f and the embedded rear end surface 57r. The outer ring 61 has the outer ring groove 65 into which the outer shroud 55 of each of the plurality of first-stage stationary blades 51a enters, the outer ring gas path surface 61p, the outer ring rear end surface 61r, and the outer ring outer peripheral surface 61o. The outer ring groove 65 is recessed from an end on the axis downstream side Dad of the outer ring gas path surface 61p toward the radially outer side Dro, and extends in the circumferential direction Dc. The outer ring groove 65 has the groove front side surface 65f that faces the axis downstream side Dad and that faces the embedded front end surface 57f, the groove rear side surface 65r that faces the axis upstream side Dau and that faces the embedded rear end surface 57r, and the groove bottom surface 65b that faces the radially inner side Dri and that faces the embedded bottom surface 57b. The outer ring gas path surface 61p has a curved surface so as to gradually extend toward the axis downstream side Dad toward the radially inner side Dri from a position on the axis upstream side Dau with respect to the groove front side surface 65f and on the radially outer side Dro with respect to the outer gas path surface 56p, and to be continuous with the outer gas path surface 56p. The outer ring rear end surface 61r is located on the axis downstream side Dad with respect to the outer ring groove 65 and faces the axis downstream side Dad. The outer ring outer peripheral surface 61o faces the radially outer side Dro and connects an edge on the radially outer side Dro of the outer ring gas path surface 61p and an edge on the radially outer side Dro of the outer ring rear end surface 61r. The embedded front end surface 57f is located on the axis upstream side Dau with respect to the leading edge 52f. The embedded rear end surface 57r is located on the axis upstream side Dau with respect to the trailing edge 52r.

In the first-stage stationary blade segment 60 of this aspect, the embedded front end surface 57f of the embedded portion 57 in the first-stage stationary blade 51a is located on the axis upstream side Dau with respect to the leading edge 52f of the blade body 52 of the first-stage stationary blade 51a, and the embedded rear end surface 57r of the embedded portion 57 is located on the axis upstream side Dau with respect to the trailing edge 52r of the blade body 52. Therefore, in the first-stage stationary blade 51a of the first-stage stationary blade segment 60 of this aspect, the embedded portion 57 is shifted to the axis upstream side Dau with respect to the blade body 52. Therefore, the groove rear side surface 65r of the outer ring groove 65 into which the embedded portion 57 of the first-stage stationary blade 51a enters can be prevented from being located on the axis upstream side Dau with respect to the trailing edge 52r of the blade body 52, and the outer ring rear end surface 61r can be prevented from being located on the axis downstream side Dad with respect to the first-stage stationary blade 51a. In other words, in this aspect, it is possible to reduce protruding portions of the outer ring 61 to the axis downstream side Dad with respect to the first-stage stationary blade 51a, or it is possible to eliminate protruding portions of the outer ring 61 to the axis downstream side Dad with respect to the first-stage stationary blade 51a.

Therefore, in this aspect, the degree of freedom in designing the casing 20 on which the outer ring 61 is mounted can be increased. In this manner, the degree of freedom in designing the casing 20 is increased, so that it is possible to make a part of the casing 20 present even within a common region of the region in the axis direction Da where the first-stage rotor blade 13 is present and the region in the radial direction Dr where the outer ring 61 is present. If it is possible to make a part of the casing 20 present in the common region, the first-stage seal ring 40a, which seals the gap between the casing 20 and the first-stage rotor blade 13, can be mounted on a part of the casing 20 without widening the interval in the axis direction Da between the first-stage stationary blade 51a and the first-stage rotor blade 13.

If the interval in the axis direction Da between the first-stage stationary blade 51a and the first-stage rotor blade 13 is widened, there is a high probability of reducing turbine efficiency. However, in this aspect, as described above, the first-stage seal ring 40a can be mounted on a part of the casing 20 without widening the interval in the axis direction Da between the first-stage stationary blade 51a and the first-stage rotor blade 13. Therefore, in this aspect, it is possible to increase the degree of freedom in designing the casing 20 while satisfying requirements such as turbine efficiency.

(2) In a first-stage stationary blade segment in a second aspect, in the first-stage stationary blade segment 60 in the first aspect, the maximum distance do in the axis direction Da between the groove rear side surface 65r and the outer ring rear end surface 61r is smaller than the minimum distance ds in the axis direction Da between the embedded front end surface 57f and the embedded rear end surface 57r.

In this aspect, more reliably than in the first aspect, it is possible to reduce protruding portions of the outer ring 61 toward the axis downstream side Dad with respect to the first-stage stationary blade 51a, or it is possible to eliminate protruding portions of the outer ring 61 toward the axis downstream side Dad with respect to the first-stage stationary blade 51a.

(3) In a first-stage stationary blade segment in a third aspect, the first-stage stationary blade segment 60 in the first or second aspect further includes the caulking member 63 that restrains relative movement of the plurality of first-stage stationary blades 51a with respect to the outer ring 61. The outer ring 61 further has the storage space forming portion 67. The storage space forming portion 67 has a surface that forms the storage space 67s, into which the caulking member 63 enters and in which the radially inner side Dri is open, in cooperation with the outer shrouds 55 of the plurality of first-stage stationary blades 51a. The embedded portion 57 further has the engaging groove 57g that is recessed from the embedded rear end surface 57r toward the axis upstream side Dau and that extends in the circumferential direction Dc. The outer ring groove 65 further has the protrusion portion 65c that protrudes from the groove rear side surface 65l toward the axis upstream side Dau, extends in the circumferential direction Dc, and is fitted into each of the engaging grooves 57g of the embedded portions 57 of the plurality of first-stage stationary blades 51a. The storage space forming portion 67 is connected to the end on the radially inner side Dri of the groove front side surface 65f. The caulking member 63 extends in the circumferential direction Dc, is accommodated in the storage space 67s, comes into contact with the surface of the storage space forming portion 67, comes into contact with each of the outer shrouds 55 of the plurality of first-stage stationary blades 51a, and is exposed from the opening 68 of the storage space 67s.

In this aspect, the relative movement of the first-stage stationary blade 51a with respect to the outer ring 61 can be restrained by the caulking member 63.

(4) In a first-stage stationary blade segment in a fourth aspect, in the first-stage stationary blade segment 60 in any one of the first to third aspects, the shroud main body 56 has the shroud rear end surface 56r that faces the axis downstream side Dad and that extends from the end on the axis downstream side Dad of the outer gas path surface 56p toward the radially outer side Dro. The outer ring rear end surface 61r is flush with the shroud rear end surface 56r.

In this aspect, it is possible to eliminate protruding portions of the outer ring 61 toward the axis downstream side Dad with respect to the first-stage stationary blade 51a.

The stationary unit in the embodiment described above is understood as follows, for example.

(5) A stationary unit in a fifth aspect includes the first-stage stationary blade segment 60 in any one of the first to fourth aspects, and the blade ring 30a on which the first-stage stationary blade segment 60 and the first-stage seal ring 40a are mounted. The blade ring 30a has the blade ring gas path surface 32 which faces the radially inner side Dri, the outer ring mounting portion 33a on which the outer ring 61 is mounted, and the first-stage seal ring mounting portion 36a on which the first-stage seal ring 40a is mounted. The first-stage seal ring mounting portion 36a is recessed from the blade ring gas path surface 32 toward the radially outer side Dro and extends in the circumferential direction Dc. The entire outer ring mounting portion 33a is located on the axis upstream side Dau with respect to the first-stage seal ring mounting portion 36a.

In this aspect, the first-stage seal ring 40a, which seals the gap between the blade ring 30a and the first-stage rotor blade 13, can be mounted on the blade ring 30a that configures a part of the casing 20, without widening the interval in the axis direction Da between the first-stage stationary blade 51a and the first-stage rotor blade 13.

(6) In a stationary unit in a sixth aspect, in the stationary unit 80 in the fifth aspect, the outer ring mounting portion 33a of the blade ring 30a has the mounting side surface 34 and the mounting inner peripheral surface 35. The mounting side surface 34 extends from a position on the axis upstream side Dau with respect to the first-stage seal ring mounting portion 36a toward the radially outer side Dro, extends in the circumferential direction Dc in the blade ring gas path surface 32, and faces the outer ring rear end surface 61r. The mounting inner peripheral surface 35 extends from the edge on the radially outer side Dro of the mounting side surface 34 toward the axis upstream side Dau, extends in the circumferential direction Dc, and faces the outer ring outer peripheral surface 61o.

In this aspect, the mounting side surface 34 of the blade ring 30a can be made to closely face the outer ring rear end surface 61r.

(7) In a stationary unit in a seventh aspect, the stationary unit 80 in the fifth or sixth aspect further includes the plurality of rear-stage stationary blade rows 50r arranged in the axis direction Da. Each of the plurality of rear-stage stationary blade rows 50r includes the plurality of stationary blades 51 arranged in the circumferential direction Dc. The blade ring 30a has the plurality of blade ring grooves 39 arranged in the axis direction Da within a region on the axis downstream side Dad with respect to the first-stage seal ring mounting portion 36a. All of the plurality of blade ring grooves 39 are recessed from the blade ring gas path surface 32 toward the radially outer side Dro and extend in the circumferential direction Dc. The plurality of stationary blades 51 that configure one stationary blade row 50, among the plurality of rear-stage stationary blade rows 50r, are fitted into each of the plurality of blade ring grooves 39.

The steam turbine in the embodiment described above is understood as follows, for example.

(8) A steam turbine in an eighth aspect includes the stationary unit 80 in any one of the fifth to seventh aspects, the steam inlet duct 16, the rotor 10 rotatable with the axis Ar as a center, and the casing 20 that covers an outer periphery of the rotor 10. The casing 20 has the blade ring 30a. The steam inlet duct 16 is disposed such that the steam S flows in between the outer periphery side of the rotor 10 and the inner periphery side of the casing 20 from the axis upstream side Dau.

The first-stage stationary blade segment unit in the embodiment described above is understood as follows, for example.

(9) A first-stage stationary blade segment unit in a ninth aspect includes the first first-stage stationary blade segment 60f that is the first-stage stationary blade segment 60 in any one of the first to fourth aspects, the second first-stage stationary blade segment 60s disposed to be spaced apart from the first first-stage stationary blade segment 60f toward the second side Da2, and the diverting member 71 that extends in the circumferential direction Dc and that connects the first first-stage stationary blade segment 60f and the second first-stage stationary blade segment 60s. The second first-stage stationary blade segment 60s includes the second outer ring 61s which extends in the circumferential direction Dc and has the same shape as the first outer ring 61f that is the outer ring 61 of the first first-stage stationary blade segment 60f, and in which the first side Da1 is the axis upstream side Dau and the second side Da2 is the axis downstream side Dad, and the plurality of second first-stage stationary blades 51as which are mounted side by side in the circumferential direction Dc on the radially inner side Dri of the second outer ring 61s and have the same shape as the plurality of first first-stage stationary blades 51af that are the plurality of first-stage stationary blades 51a of the first first-stage stationary blade segment 60f, and in which the first side Da1 is the axis upstream side Dau and the second side Da2 is the axis downstream side Dad. The diverting member 71 has the first connecting portion 72f that is connected to the inner shroud 53 of each of the plurality of first first-stage stationary blades 51af, the second connecting portion 72s that is connected to the inner shroud 53 of each of the plurality of second first-stage stationary blades 51as, and the main body 73 that connects the first connecting portion 72f and the second connecting portion 72s. The main body 73 has the gas path surfaces 74f and 74s that face the radially outer side Dro, extend in the axis direction Da, and are continuous with the inner gas path surface 53p of each of the plurality of first first-stage stationary blades 51af and with the inner gas path surface 53p of each of the plurality of second first-stage stationary blades 51as.

In this aspect, part of the steam S flowing from the radially outer side Dro of the diverting member 71 toward the radially inner side Dri can be led to the first first-stage stationary blade 51af, and the remaining part of the steam S can be led to the second first-stage stationary blade 51as.

(10) In a first-stage stationary blade segment unit in a tenth aspect, in the first-stage stationary blade segment unit 70 in the ninth aspect, the inner shroud 53 has the counter-gas path surface 53q that faces the radially inner side Dri and that is in a back-to-back relationship with the inner gas path surface 53p, and the connection groove 53g that is recessed from the counter-gas path surface 53q toward the radially outer side Dro and that extends in the circumferential direction Dc. The first connecting portion 72f has the protrusion portion 72fc that is fitted into the connection groove 53g of the inner shroud 53 of each of the plurality of first first-stage stationary blades 51af. The second connecting portion 72s has the protrusion portion 72sc that is fitted into the connection groove 53g of the inner shroud 53 of each of the plurality of second first-stage stationary blades 51as. The connection groove 53g is formed such that a groove width in the axis direction Da gradually increases toward the radially outer side Dro. Each of the protrusion portions 72fc and 72sc is formed such that a protrusion width in the axis direction Da gradually increases toward the radially outer side Dro.

In this aspect, even if the inner shroud 53 of each of the plurality of first first-stage stationary blades 51af and the diverting member 71 are not weld-connected to each other, the inner shroud 53 of each of the plurality of first first-stage stationary blades 51af and the diverting member 71 can be firmly connected to each other. Further, in this aspect, even if the inner shroud 53 of each of the plurality of second first-stage stationary blades 51as and the diverting member 71 are not weld-connected to each other, the inner shroud 53 of each of the plurality of second first-stage stationary blades 51as and the diverting member 71 can be firmly connected to each other.

(11) In a first-stage stationary blade segment unit in an eleventh aspect, in the first-stage stationary blade segment unit 70 in the ninth or tenth aspect, the diverting member 71 includes the first diverting member 71f, the second diverting member 71s, and the connector 76. The first diverting member 71f has the first connecting portion 72f, and the first main body 73f that extends from the first connecting portion 72f toward the second side Da2 and that forms a part of the main body. The second diverting member 71s has the second connecting portion 72s, and the second main body 73s that extends from the second connecting portion 72s toward the first side Da1 and that forms a remaining part of the main body. The connector 76 connects the first main body 73f and the second main body 73s.

In this aspect, since the diverting member 71 is divided into the first diverting member 71f and the second diverting member 71s, it is not necessary to perform in parallel the work of inserting the protrusion portion 72fc of the first connecting portion 72f of the first diverting member 71f into the connection groove 53g of each of the plurality of first first-stage stationary blades 51af and the work of inserting the protrusion portion 72sc of the second connecting portion 72s of the second diverting member 71s into the connection groove 53g of each of the plurality of second first-stage stationary blades 51as. Therefore, in this aspect, the first connecting portion 72f of the diverting member 71 can be easily connected to the plurality of first first-stage stationary blades 51af, and the second connecting portion 72s of the diverting member 71 can be easily connected to the plurality of second first-stage stationary blades 51as.

The steam turbine in the embodiment described above is understood as follows, for example.

(12) A steam turbine in a twelfth aspect includes the first-stage stationary blade segment unit 70 in any one of the ninth to eleventh aspects, the steam inlet duct 16, the first rotor 10f rotatable with the axis Ar as a center, the plurality of first rear-stage stationary blade rows 50rf arranged in the axis direction Da on the outer periphery side of the first rotor 10f, the first casing 20f which covers the outer periphery side of the first rotor 10f and on which the first first-stage stationary blade segment 60f and the plurality of first rear-stage stationary blade rows 50rf are mounted, the second rotor 10s rotatable with the axis Ar as a center, the plurality of second rear-stage stationary blade rows 50rs arranged in the axis direction Da on the outer periphery side of the second rotor 10s, and the second casing 20s which covers the outer periphery side of the second rotor 10s and on which the second first-stage stationary blade segment 60s and the plurality of second rear-stage stationary blade rows 50rs are mounted. The first rotor 10f and the second rotor 10s are located on the same axis Ar and are connected to each other. The steam inlet duct 16 is disposed at a position separated from the gas path surface of the diverting member 71 toward the radially outer side Dro, and connects the first casing 20f and the second casing 20s.

INDUSTRIAL APPLICABILITY

According to an aspect of the present disclosure, it is possible to increase the degree of freedom in designing a casing while satisfying requirements such as turbine efficiency.

REFERENCE SIGNS LIST

10: rotor
10f: first rotor
10s: second rotor
11: rotor shaft
12: rotor blade row
12a: first-stage rotor blade row
12b: second-stage rotor blade row
12c: third-stage rotor blade row
12d: fourth-stage rotor blade row
12e: fifth-stage rotor blade row
12g: last-stage rotor blade row
13: rotor blade
15: bearing
16: steam inlet duct
17: steam flow path
20: casing
20f: first casing
20s: second casing
21: inner casing
22: exhaust casing
22s: exhaust space
23: diffuser
23s: diffuser space
24: downstream-side end plate
25: upstream-side end plate
26: side peripheral plate
27: discharge port
30: blade ring
30a: first blade ring
30au: first upper half blade ring
30b: second blade ring
30c: third blade ring
31: bolt hole
32b: blade ring connecting bolt
32: blade ring gas path surface
33a: outer ring mounting portion
33b: second-stage stationary blade row mounting portion
33c: third-stage stationary blade row mounting portion
33d: fourth-stage stationary blade row mounting portion
33e: fifth-stage stationary blade row mounting portion
34: mounting side surface
35: mounting inner peripheral surface 36a: first-stage seal ring mounting portion
36b: second-stage seal ring mounting portion
36c: third-stage seal ring mounting portion
36d: fourth-stage seal ring mounting portion
36e: fifth-stage seal ring mounting portion
37: base storage groove
38: leg storage groove
39: blade ring groove
40a: first-stage seal ring
40b: second-stage seal ring
40c: third-stage seal ring
40d: fourth-stage seal ring
40e: fifth-stage seal ring
41: seal ring base
42: fin
43: base support leg
50: stationary blade row
50a: first-stage stationary blade row
50af: first first-stage stationary blade row
50as: second first-stage stationary blade row
50r: rear-stage stationary blade row
50rf: first rear-stage stationary blade row
50rs: second rear-stage stationary blade row
50b: second-stage stationary blade row
50c: third-stage stationary blade row
50d: fourth-stage stationary blade row
50e: fifth-stage stationary blade row
50f: sixth-stage stationary blade row
50g: seventh-stage stationary blade row
51: stationary blade
51a: first-stage stationary blade
51af: first first-stage stationary blade
51as: second first-stage stationary blade
52: blade body
52f: leading edge
52r: trailing edge
53: inner shroud
53p: inner gas path surface
53q: counter-gas path surface
53g: connection groove
55: outer shroud
56: shroud main body
56p: outer gas path surface
56f: shroud front end surface
56r: shroud rear end surface
57: embedded portion
57f: embedded front end surface
57r: embedded rear end surface
57b: embedded bottom surface
57g: engaging groove
60: first-stage stationary blade segment
60f: first first-stage stationary blade segment
60s: second first-stage stationary blade segment
61: outer ring
61f: first outer ring
61s: second outer ring
61u: upper half outer ring
61d: lower half outer ring
61p: outer ring gas path surface
61r: outer ring rear end surface
61o: outer ring outer peripheral surface
62: outer ring connecting bolt
63: caulking member
64: setscrew
65: outer ring groove
65f: groove front side surface
65r: groove rear side surface
65b: groove bottom surface
65c: protrusion portion
67: storage space forming portion
67s: storage space
67b: space bottom surface
67r: space back surface
67o: space bottom facing surface
67p: space side surface
68: opening
69: support plate
70: first-stage stationary blade segment unit
71: diverting member
71u: upper half diverting member
71d: lower half diverting member
71f: first diverting member
71s: second diverting member
72f: first connecting portion
72s: second connecting portion
72fc, 72sc: protrusion portion
73: main body
73f: first main body
73s: second main body
74f: first gas path surface
74s: second gas path surface
75f: first flange
75s: second flange
76: connector
77: spacer
80: stationary unit
Ar: axis
Ap: duct axis
Da: axis direction
Da1: first side
Da2: second side
Dau: axis upstream side
Dad: axis downstream side
Dc: circumferential direction
Dr: radial direction
Dri: radially inner side
Dro: radially outer side
C: condenser
S: steam
ST1: first steam turbine section
ST2: second steam turbine section

The invention claimed is:
1. A first-stage stationary blade segment comprising:
an outer ring that extends in a circumferential direction with respect to an axis; and
a plurality of first-stage stationary blades mounted side by side in the circumferential direction on a radially inner side of the outer ring with respect to the axis of the outer ring,
wherein, out of a first side and a second side in an axis direction in which the axis extends, the second side forms an axis upstream side, and the first side forms an axis downstream side,
each of the plurality of first-stage stationary blades includes a blade body extending in a radial direction with respect to the axis, an inner shroud formed on a radially inner side of the blade body, and an outer shroud formed on a radially outer side of the blade body,
the blade body has a leading edge that forms an edge on the axis upstream side, and a trailing edge that forms an edge on the axis downstream side, the inner shroud has an inner gas path surface which faces radially outward with respect to the axis, and to which the blade body is connected, the outer shroud has a shroud main body having an outer gas path surface which faces radially inward with respect to the axis and to which the blade body is connected, and an embedded portion connected to a radially outer side of the shroud main body, the embedded portion has an embedded front end surface that faces the axis upstream side, an embedded rear end surface that faces the axis downstream side and that is in a back-to-back relationship with the embedded front end surface, and an embedded bottom surface that faces radially outward with respect to the axis and that connects the embedded front end surface and the embedded rear end surface, the outer ring has an outer ring groove into which the outer shroud of each of the plurality of first-stage stationary blades enters, an outer ring gas path surface, an outer ring rear end surface, and an outer ring outer peripheral surface, the outer ring groove is recessed radially outward with respect to the axis from an end on the axis downstream side of the outer ring gas path surface, and extends in the circumferential direction, the outer ring groove has a groove front side surface that faces the axis downstream side and that faces the embedded front end surface, a groove rear side surface that faces the axis upstream side and that faces the embedded rear end surface, a groove bottom surface that faces radially inward with respect to the axis and that faces the embedded bottom surface, and a protrusion portion which is arranged inside of the outer ring groove and which protrudes from the groove rear side surface toward the groove front side surface, the outer ring gas path surface has a curved surface so as to gradually extend toward the axis downstream side and radially inward with respect to the axis from a position on the axis upstream side with respect to the groove front side surface and on the radially outer side with respect to the outer gas path surface, and to be continuous with the outer gas path surface, the outer ring rear end surface is located on the axis downstream side with respect to the outer ring groove and faces the axis downstream side, the outer ring outer peripheral surface faces radially outward with respect to the axis and connects an edge on the radially outer side of the outer ring gas path surface and an edge on the radially outer side of the outer ring rear end surface, the embedded front end surface is located on the axis upstream side with respect to the leading edge, and the embedded rear end surface is located on the axis upstream side with respect to the trailing edge.

2. The first-stage stationary blade segment according to claim 1, wherein a maximum distance in the axis direction between the groove rear side surface and the outer ring rear end surface is smaller than a minimum distance in the axis direction between the embedded front end surface and the embedded rear end surface.

3. The first-stage stationary blade segment according to claim 1, further comprising:

a caulking member that restrains relative movement of the plurality of first-stage stationary blades with respect to the outer ring, wherein the outer ring further has a storage space forming portion, the storage space forming portion has a surface that forms a storage space, into which the caulking member enters and in which the radially inner side with respect to the axis is open, in cooperation with the outer shrouds of the plurality of first-stage stationary blades, the embedded portion further has an engaging groove that is recessed from the embedded rear end surface toward the axis upstream side and that extends in the circumferential direction, the protrusion portion extends in the circumferential direction, and is fitted into each of the engaging grooves of the embedded portions of the plurality of first-stage stationary blades, the storage space forming portion is connected to an end on the radially inner side with respect to the axis of the groove front side surface, and the caulking member extends in the circumferential direction, is accommodated in the storage space, comes into contact with the surface of the storage space forming portion, comes into contact with each of the outer shrouds of the plurality of first-stage stationary blades, and is exposed from an opening of the storage space.

4. The first-stage stationary blade segment according to claim 1, wherein the shroud main body has a shroud rear end surface that faces the axis downstream side and that extends from an end on the axis downstream side of the outer gas path surface radially outward with respect to the axis, and the outer ring rear end surface is flush with the shroud rear end surface.

5. A stationary unit comprising:

the first-stage stationary blade segment according to claim 1; and a blade ring on which the first-stage stationary blade segment and a first-stage seal ring are mounted, wherein the blade ring has a blade ring gas path surface that faces radially inward with respect to the axis, an outer ring mounting portion on which the outer ring is mounted, and a first-stage seal ring mounting portion on which the first-stage seal ring is mounted, the first-stage seal ring mounting portion is recessed from the blade ring gas path surface radially outward with respect to the axis and extends in the circumferential direction, and the entire outer ring mounting portion is located on the axis upstream side with respect to the first-stage seal ring mounting portion.

6. The stationary unit according to claim 5, wherein the outer ring mounting portion of the blade ring has a mounting side surface and a mounting inner peripheral surface, the mounting side surface extends from a position on the axis upstream side with respect to the first-stage seal ring mounting portion radially outward with respect to the axis in the blade ring gas path surface, extends in the circumferential direction, and faces the outer ring rear end surface, and the mounting inner peripheral surface extends from an edge on the radially outer side with respect to the axis of the mounting side surface toward the axis upstream side, extends in the circumferential direction, and faces the outer ring outer peripheral surface.

7. The stationary unit according to claim 5, further comprising:

a plurality of rear-stage stationary blade rows arranged in the axis direction, wherein each of the plurality of rear-stage stationary blade rows includes a plurality of stationary blades arranged in the circumferential direction, the blade ring has a plurality of blade ring grooves arranged in the axis direction within a region on the axis downstream side with respect to the first-stage seal ring mounting portion, all of the plurality of blade ring grooves are recessed from the blade ring gas path surface radially outward with respect to the axis and extend in the circumferential direction, and the plurality of stationary blades that configure one of the plurality of rear-stage stationary blade rows are fitted into each of the plurality of blade ring grooves.

8. A steam turbine comprising:

the stationary unit according to claim 5;

a steam inlet duct;

a rotor rotatable with the axis as a center; and a casing that covers an outer periphery of the rotor, wherein the casing has the blade ring, and the steam inlet duct is disposed such that steam flows in between an outer periphery side of the rotor and an inner periphery side of the casing from the axis upstream side.

9. A first-stage stationary blade segment unit comprising:

a first first-stage stationary blade segment that is the first-stage stationary blade segment according to claim 1;

a second first-stage stationary blade segment disposed to be spaced apart from the first first-stage stationary blade segment toward the second side; and a diverting member that extends in the circumferential direction and that connects the first first-stage stationary blade segment and the second first-stage stationary blade segment, wherein the second first-stage stationary blade segment includes;

a second outer ring which extends in the circumferential direction and has the same shape as a first outer ring that is the outer ring of the first first-stage stationary blade segment, and in which the first side is an axis upstream side and the second side is an axis downstream side; and a plurality of second first-stage stationary blades which are mounted side by side in the circumferential direction on the radially inner side of the second outer ring and have the same shape as a plurality of first first-stage stationary blades that are the plurality of first-stage stationary blades of the first first-stage stationary blade segment, and in which the first side is an axis upstream side and the second side is an axis downstream side, wherein the diverting member has a first connecting portion that is connected to the inner shroud of each of the plurality of first first-stage stationary blades, a second connecting portion that is connected to the inner shroud of each of the plurality of second first-stage stationary blades, and a main body that connects the first connecting portion and the second connecting portion, and the main body has a gas path surface that faces radially outward with respect to the axis, extends in the axis direction, and is continuous with the inner gas path surface of each of the plurality of first first-stage stationary blades and with the inner gas path surface of each of the plurality of second first-stage stationary blades.

10. The first-stage stationary blade segment unit according to claim 9, wherein the inner shroud has a counter-gas path surface that faces radially inward with respect to the axis and that is in a back-to-back relationship with the inner gas path surface, and a connection groove that is recessed from the counter-gas path surface toward the radially outer side and that extends in the circumferential direction, the first connecting portion has a protrusion portion that is fitted into the connection groove of the inner shroud of each of the plurality of first first-stage stationary blades, the second connecting portion has a protrusion portion that is fitted into the connection groove of the inner shroud of each of the plurality of second first-stage stationary blades, the connection groove is formed such that a groove width in the axis direction gradually increases radially outward with respect to the axis, and the protrusion portion is formed such that a protrusion width in the axis direction gradually increases radially outward with respect to the axis.

11. The first-stage stationary blade segment unit according to claim 9, wherein the diverting member includes a first diverting member, a second diverting member, and a connector, the first diverting member has the first connecting portion, and a first main body that extends from the first connecting portion toward the second side and that forms a part of the main body, the second diverting member has the second connecting portion, and a second main body that extends from the second connecting portion toward the first side and that forms a remaining part of the main body, and the connector connects the first main body and the second main body.

12. A steam turbine comprising:

the first-stage stationary blade segment unit according to claim 9;

a steam inlet duct;

a first rotor rotatable with the axis as a center;

a plurality of first rear-stage stationary blade rows arranged in the axis direction on an outer periphery side of the first rotor;

a first casing which covers the outer periphery side of the first rotor and on which the first first-stage stationary blade segment and the plurality of first rear-stage stationary blade rows are mounted;

a second rotor rotatable with the axis as a center;

a plurality of second rear-stage stationary blade rows arranged in the axis direction on an outer periphery side of the second rotor; and a second casing which covers the outer periphery side of the second rotor and on which the second first-stage stationary blade segment and the plurality of second rear-stage stationary blade rows are mounted, wherein the first rotor and the second rotor are located on the same axis and are connected to each other, and the steam inlet duct is disposed at a position separated from the gas path surface of the diverting member toward the radially outer side with respect to the axis, and connects the first casing and the second casing.

* * * * *